(12) United States Patent
Annamalai et al.

(10) Patent No.: US 12,082,181 B2
(45) Date of Patent: Sep. 3, 2024

(54) RESOURCE ALLOCATION FOR CELLULAR NETWORKS

(71) Applicant: Intel Corporation, Santa Clara, CA (US)

(72) Inventors: Parthiban Annamalai, Bangalore (IN); Jyotsna Bapat, Ka (IN); Debabrata Das, Ka (IN)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 17/470,142

(22) Filed: Sep. 9, 2021

(65) Prior Publication Data

US 2022/0201699 A1 Jun. 23, 2022

(30) Foreign Application Priority Data

Dec. 18, 2020 (EP) ..................................... 20215433

(51) Int. Cl.
*H04W 72/121* (2023.01)
*H04L 5/14* (2006.01)
(Continued)

(52) U.S. Cl.
CPC .............. *H04W 72/121* (2013.01); *H04L 5/14* (2013.01); *H04W 4/023* (2013.01);
(Continued)

(58) Field of Classification Search
None
See application file for complete search history.

(56) References Cited

U.S. PATENT DOCUMENTS

2015/0365939 A1* 12/2015 Zhang ................... H04L 5/0037
370/336
2019/0075471 A1* 3/2019 Wang .................... H04W 72/23
(Continued)

FOREIGN PATENT DOCUMENTS

| EP | 2919411 A1 | 9/2015 |
|----|------------|--------|
| EP | 3373630 A1 | 9/2018 |
| WO | 2020040530 A1 | 2/2020 |

OTHER PUBLICATIONS

Jun. 11, 2021 (PCT) International Search Report and Written Opinion—App. EP 20 21 5433.
(Continued)

*Primary Examiner* — Mohammad S Adhami
(74) *Attorney, Agent, or Firm* — Banner & Witcoff Ltd.

(57) ABSTRACT

Techniques are disclosed for increasing the sum spectral efficiency (SE) of cellular networks including Hybrid In Band Full Duplex (IBFD) cellular networks. These techniques include using various constraints to identify UEs that qualify to be included as part one or more frequency sharing groups. The qualification process may use, as one of the constraints, a distance between served UEs such that UEs that are too close to one another are disqualified. The UE frequency sharing groups may include at least two UEs that use the same shared frequency as an upload channel frequency one UE as the other UE uses for a downlink channel frequency. Techniques are also disclosed for the allocation of frequencies and to determine when the current groupings and/or allocated frequencies are invalid.

20 Claims, 17 Drawing Sheets

(51) Int. Cl.
*H04W 4/02* (2018.01)
*H04W 72/0453* (2023.01)
*H04W 72/541* (2023.01)
*H04W 72/542* (2023.01)

(52) U.S. Cl.
CPC ..... *H04W 72/0453* (2013.01); *H04W 72/541* (2023.01); *H04W 72/542* (2023.01)

(56) References Cited

U.S. PATENT DOCUMENTS

| | | | |
|---|---|---|---|
| 2020/0084759 A1* | 3/2020 | Liu | H04L 1/1671 |
| 2021/0009080 A1* | 1/2021 | Hu | G06V 40/40 |
| 2021/0281336 A1* | 9/2021 | Upadhya | H04B 17/373 |
| 2021/0329660 A1* | 10/2021 | Zhang | H04W 72/0446 |

OTHER PUBLICATIONS

A. Parthiban, et al., "Doubling Spectral Efficiency Independent of Cell Sizes in 5G Using Hybrid IBFD Cellular Network 11," 2020 IEEE Wireless Communications Workshops (WCNCW), IEEE, 7pgs., Apr. 6, 2020.

* cited by examiner

| M | UE Grouping | UL/DL | $f_p$ | $f_q$ | $f_r$ | $f_s$ | $f_t$ | $f_u$ |
|---|---|---|---|---|---|---|---|---|
| 0 | Legacy[a] | UL | $UE_i$ | | | | | |
| | | DL | | $UE_j$ | | | | |
| 2 | Twin[b] | UL | | | | $UE_j$ | $UE_i$ | |
| | | DL | | | | $UE_i$ | $UE_j$ | |
| 0 | Legacy[a] | UL | $UE_i$ | | | | | |
| | | DL | | $UE_j$ | $UE_k$ | | | |
| 3 | Triplet[c] | UL | | | | $UE_i$ | $UE_j$ | $UE_k$ |
| | | DL | | | | $UE_k$ | $UE_i$ | $UE_j$ |
| 3 | Triplet[d] | UL | | | | $UE_i$ | $UE_k$ | $UE_i$ |
| | | DL | | | | $UE_j$ | $UE_j$ | $UE_k$ |

[a] *No sharing* (as per (40) for DL and (46) for UL)
[b] *Twin* sharing (as per (40) for DL and (43) for UL)
[c] *Triplet* sharing (Option 1: as per (40) for DL and (42) for UL)
[d] *Triplet* sharing (Option 2: as per (40) for DL and (42) for UL)

FIG. 15

RESOURCE ALLOCATION FOR CELLULAR NETWORKS

TECHNICAL FIELD

Aspects described herein generally relate to techniques for increasing the sum spectral efficiency (SE) of cellular networks using resource allocation techniques.

BACKGROUND

As spectrum is a scarce resource, enhancing Spectral Efficiency (SE) is a recommended approach to achieve higher data rates in cellular networks. Current techniques to do so, however, have been inadequate.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 15 illustrates an example allocation of qualifying DL channel frequencies to be used as UL channel frequencies shared within the UE frequency sharing groups, in accordance with one or more aspects of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
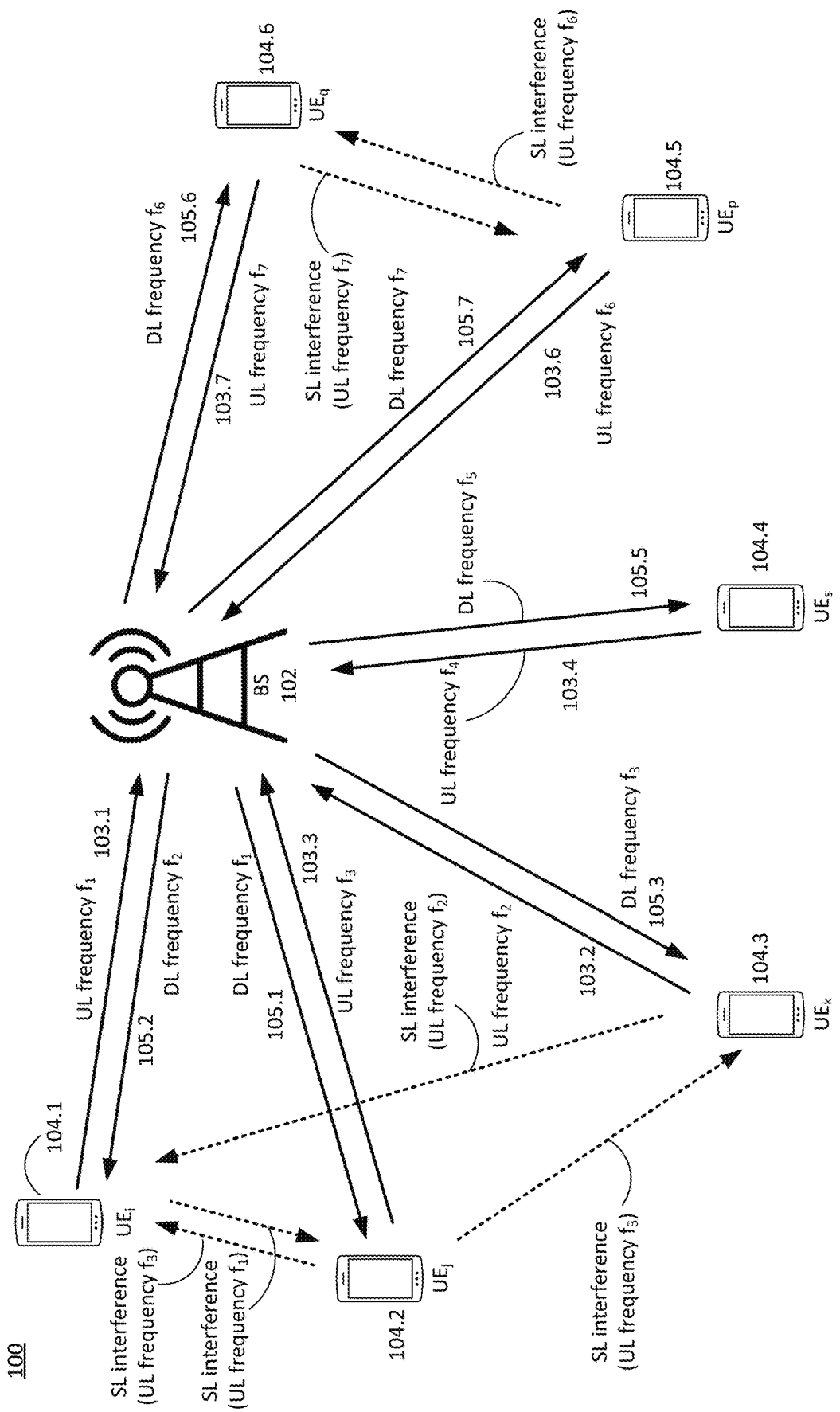
FIG. 1 illustrates an example cellular network, in accordance with one or more aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, enhancing Spectral Efficiency (SE) is a recommended approach to achieve higher data rates in cellular networks. In Band Full Duplex (IBFD) is emerging as a promising radio technology that can potentially double SE. However, due to the complexities associated in realizing IBFD transceivers, Hybrid IBFD Cellular Network (HICN) is often deployed in practice, which limits the IBFD capability only to the Base Station (BS) while accommodating legacy Half Duplex (HD) User Equipments (UEs). The aspects described herein are explained with reference to HICNs as a non-limiting example, although the aspects described herein may be applied to any suitable type of cellular network or even non-cellular networks (e.g. Wi-Fi networks). As discussed in further detail below, the aspects described herein may be particularly useful when implemented as part of an HICN, and the processes described in accordance with the following aspects may exploit mathematical constraint optimization problems for resource allocation to maximize that is referred to as "sum-SE" of the system (e.g. a cellular network).

Previous solutions to address this issue and improve the overall sum-SE include the use of Non-Orthogonal Multiple Access (NOMA), Multi-User Multiple Input Multiple Output (MIMO), and other resource allocation techniques for HICN-like networks. However, addressing the resource allocation problem in NOMA is very challenging and computationally intensive for higher number of UEs, and the SE gain in MU-MIMO is severely impacted if the spatial correlation between receive antennas is poor, and Channel State Information (CSI) overhead is significantly higher.

Moreover, other existing resource allocation schemes for HICH-like networks assume complete knowledge of all CSIs such as the Uplink (UL), Downlink (DL), and Sidelink (SL) at the BS, which is often not the case. Also, although UL and DL CSIs can be estimated at the BS, no provision exists to obtain SL CSI in current cellular technologies. Existing resource allocation schemes also propose to obtain this SL CSI, but this either requires fundamental changes to the frame structure or deploying neighbor recovery techniques at UEs, which requires additional processing at UEs and signaling overhead between UEs and BSs.

Still further, existing allocation resource schemes only share frequencies between a pair of UEs. Thus, in the case of an odd number of UEs being eligible for frequency sharing, one UE cannot participate in the frequency sharing due to these dual pairing limitations. This reduces the maximum sum-SE achievable. Existing resource allocation techniques also function to iteratively identify UEs for frequency sharing, which requires a longer time to converge to an optimal solution and may result in convergence issues. Further complicating these matters, existing resource allocation techniques also have a higher than polynomial time complexity, and hence the calculations required do not fit into a practical time budget.

The aspects described herein address these issues by recognizing the lack of UE-to-UE Sidelink (SL) Channel State Information (CSI) in existing cellular network systems. The aspects described herein implement location-aware techniques to estimate the UE-to-UE SL CSI without requiring additional computational overhead at the UEs and avoid signaling overhead between UEs and BS. As further discussed below, multiple constraints are used to determine the frequency sharing possibilities among all UEs in a cellular network (such as an HICN, which may be represented as an adjacency matrix that functions to facilitate an optimal grouping of UEs such as triplets (three UEs) and/or twins (two UEs) for frequency sharing to enhance sum-SE. The aspects described herein may repeatedly calculate and monitor the adjacency matrix and its corresponding metrics over time and leverage the use of a calculated correlation coefficient to determine changes in the calculated adjacency matrices over time, thus making a decision whether to retain current resource allocations for subsequent time periods thereby minimizing the computational load on the BS.

The aspects described herein may advantageously increase (e.g. double) data throughput, which may be achieved within the available spectrum to enhance network capacity. This may further support nearly doubling the number of UEs without the need for additional spectrum. With the techniques described in accordance with the aspects herein, cellular services may thus be provided at a relatively cheaper rate to end users.

Furthermore, the aspects herein may function to improve SE by only requiring the BS to be IBFD capable, as the UEs may be implemented as legacy Half Duplex (HD) devices. This mode of cellular deployment provides considerable advantages given the practical difficulties such as size, cost, and power to realize all UEs as IBFD capable within a cellular network. Hence, another advantage is reducing the time to market, as the changes may be implemented in only the BS to gain the benefits of the aspects as described herein. Along this same line of reasoning, the aspects described herein support a less complex migration from legacy HD cellular networks to cellular networks such as HICN, for instance. That is, the aspects described herein only require that the BS be upgraded with IBFD capability, while retaining the rest of the network entities (including legacy HD UEs) as unchanged. And even with this migration, legacy mode operation can continue due to the backward compatibility support provided by the HICN.

An Example Cellular Network

FIG. 1 illustrates an example cellular network, in accordance with one or more aspects of the present disclosure. The cellular network 100 may be implemented in accordance with any suitable type of cellular network technology and utilize any suitable communication protocols, schemes, etc., in accordance with the applicable technology that is used for communications between the UEs 104 and the base station 102, as further discussed herein. In an aspect, the cellular network 100 may form a Hybrid In Band Full Duplex (IBFD) cellular network, although this is by way of example and not limitation. The cellular network 100 as shown in FIG. 1 may include a base station (BS) 102 that serves any suitable number of user equipments (UEs) 104. In the example shown in FIG. 1, the number of UEs 104 is 6, although this is by way of example and not limitation, and the base station 102 may service any suitable number of UEs 104 depending upon the particular implementation of the base station 102 and/or the particular region in which it is deployed. For instance, the base station 102 may be associated with a macro cell, a small cell, a femto cell, a pico cell, etc. In various aspects, the base station 102 may form part of or the entirety of a cellular network, which may include communications with additional base stations, for example as well as other wireless and/or wired networks (e.g. public switched telephone networks) to support voice and data services for the served UEs 104, which are not shown in FIG. 1 for purposes of brevity. In other words, the base station 102 may service the UEs 104 in accordance with a hybrid IBFD cellular network that is represented in FIG. 1 as the cellular network 100. Thus, the base station 102 may serve the UEs 104 as shown in FIG. 1 within a presumed wireless range, and communicate with the UEs 104.1-104.7 via a series of uplink (UL) channels 103 and downlink (DL) channels 105, as shown in FIG. 1.

Each of the UL channels 103 and DL channels 105 may utilize a specific frequency (e.g. a carrier frequency or band of frequencies identified with a specific frequency such as a center frequency) in accordance with the particular communication protocol and/or cellular network technology that is implemented via the cellular network 100. As further discussed below, the UL Channels 103 and the DL channels 105 used for communications between the UEs 104 and the base station 102 may be allocated in a specific manner and/or shared among each of the UEs 104, and be changed based upon various conditions and criteria.

Thus, the base station 102 and the UEs 104 may implement any suitable number of UL and DL channels to support any suitable type of wireless communication service(s) and/or communication protocols in accordance with the particular cellular network technology. In an aspect, the cellular network 100 may be implemented using a single-cell Orthogonal frequency-division multiple access (OFDMA) based LTE-A HICN, but is not limited to this specific type of implementation. For example, the cellular network 100 may support communications in accordance with Long-Term Evolution (LTE) standards, 3GPP cellular standards, other wireless standards implementing mm-Wave frequency bands (e.g. new radio (NR) access technology), or combinations of these. Moreover, although illustrated in FIG. 1 as mobile devices, the UEs 104 may represent any suitable type of wireless device configured to communicate with the base station 102 via the UL channels 103 and the DL channels 105, as shown in FIG. 1. For instance, the UEs 104 may be implemented as mobile devices, laptops, tablets, fitness tracking devices, smart watches, etc. In an aspect, the UEs 104 may be implemented as legacy half-duplex (HD) devices, although the aspects described herein are not limited to this particular implementation. In any event, the aspects described herein include the UEs 104 being spatially distributed within a coverage range of the base station 102, as shown in FIG. 1.

Again, aspects include the base station 102 being configured to operate as an IBFD device. IBFD technology enables the base station 102 to simultaneously transmit one signal (e.g. via a DL channel 105) and to receive another signal (e.g. via an UL channel 103) using the same frequency. The UEs 104, however, may operate as "legacy" devices, which are configured to function in a HD mode of operation. HD devices require the use of separate frequencies to transmit signals (e.g. via a UL channel 103) and receive signals (e.g. via a DL channel 105). Thus, the cellular network 100 as shown and described herein with respect to FIG. 1 may be referred to as a "hybrid" based upon the combination of the base station 102 operating as an IBFD device and the UEs 104 operating as HD devices.

IBFD wireless systems are advantageous in that such a mode of operation may provide up to twice the channel capacity compared to conventional (HD) systems. However, because of the simultaneous operation of both UL and DL channels at the same frequency, IBFD devices are prone to "self-interference" (SI), which results from the difficulty in filtering or otherwise blocking the receipt of transmitted signals back into the device. Additional detail regarding IBFD technology is thus warranted, and is further presented in the following section.

Addressing Issues with IBFD Technology

Again, a primary limitation in IBFD is the overwhelming nature of SI caused by a base station coupling transmitted signals back to its own receiver. Moreover, even if the transmitted signal is known, it cannot be completely mitigated in the receiver because of RF and other impairments. Fortunately, recent advances in SI cancellation (SIC) techniques have made great progress in reducing SI, thus guaranteeing the usage of a carrier frequency for both UL and DL at the same time. With the use of efficient SIC techniques, IBFD can offer twice the SE gain over legacy HD devices, as noted above.

The amount of SIC required in IBFD transceivers is quantified such that the residual SI power post-SIC should be below the reference sensitivity power level (REFSENS) of its receiver. However, the additional processing complexities and hardware required to achieve enough SIC limits ubiquitous usage of IBFD transceivers in cellular networks. Although a base station can afford to accommodate these changes and becomes IBFD capable, current constraints on cost, size, and power make it impractical for UEs to become IBFD capable. Thus, a hybrid IBFD cellular network (HICN), which limits IBFD capability to the base station while maintaining support for legacy HD UEs, is a preferred choice given these constraints.

Moreover, due to the IBFD capability mismatch between base stations and UEs in a HICN, addressing resource allocation for HICN is very challenging. For instance, an optimal resource allocation algorithm to maximize sum-SE, which is defined as the accumulated sum of SEs achieved by all UEs in UL and DL channels in a HICN, is a Non-deterministic Polynomial-time (NP)-hard problem. Furthermore, the basic assumption in most resource allocation schemes is that the base station is fully aware of different forms of CSIs like UE-to-BS UL CSI, BS-to-UE DL CSI, and UE-to-UE Sidelink (SL) CSI. Although it is possible to obtain UE-to-BS UL and BS-to-UE DL CSIs in existing cellular networks, the largest challenge still remains with respect to obtaining UE-to-UE SL CSI.

Overview of the Aspects

To overcome this problem, the aspects described herein implement a location-aware technique to estimate this indispensable UE-to-UE SL CSI without creating additional overhead at UEs. As discussed in further detail below, the aspects descried herein implement a frequency allocation technique (e.g. an algorithm) for cellular networks to maximize sum-SE, which may function in accordance with a practical time complexity that is feasible for implementation in accordance with a variety of cellular network communications. To enhance sum-SE, the aspects described herein include sharing frequencies among two or more UEs 104 (e.g. UEs 104.1, 104.2, or $UE_i$, $UE_j$ as alternatively denoted herein), provided the UEs 104 are sufficiently separated apart in distance. This sufficient distance of separation between UEs may be denoted herein as $d_{min}$, which may constitute a threshold distance value or be used to calculate the threshold distance value (e.g. by adding an offset factor as further discussed below). In any event, the threshold distance value ensures that UL signals transmitted via a UL channel 103 do not cause perceivable UE-to-UE in-band interference to another UE with respect to DL signals received via that UE's DL channel 105, and vice-versa.

Based on this threshold distance value constraint, as well as other optional constraints as discussed in further detail below, the aspects described herein enable frequency sharing possibilities among all UEs 104 in the cellular network 100 to be captured in an adjacency matrix, which helps to identify the correct UE groups for frequency sharing, which are referred to herein as UE frequency sharing groups. Since the probability of identifying a functioning UE frequency sharing group based upon the various constraints discussed herein diminishes with an increasing number of UEs, the aspects described herein are directed to primary examples with respect to the number of UEs in a UE frequency sharing group being either three (a 'Triplet') or two (a 'Twin'). The use of Twin and Triplet UE frequency sharing groups, however, is provided by way of example and not limitation, and the aspects described herein may use UE frequency sharing groups including any suitable number of UEs 104.

As further discussed below, an optimal (Triplets:Twins) search problem is mathematically formulated to maximize the number of UE frequency sharing groups to improve frequency sharing. A correlation of changes in the elements or set of metrics associated with the adjacency matrix over a successive set of time periods (e.g. transmission time interval (TTIs) if LTE is utilized) is also implemented to determine whether to retain current resource allocations so as to reduce the computational load on the base station 102. From the extensive complexity analysis carried out, it is also proved that the aspects described herein are computationally feasible and may be performed in a quadratic polynomial time complexity, which is solvable for practical cellular network systems.

System Modeling

Referring back to FIG. 1, the cellular network 100 includes a base station 102 that services any suitable number N of UEs 104, with 6 UEs 104.1-104.6 shown in this example. The UEs 104 each communicate with the base station 102 using a plurality of DL channels 105.1, 105.2, 105.3, 105.5, 105.6, and 105.7, each of which may operate at a particular DL frequency $f_1$, $f_2$, $f_3$, $f_5$, $f_6$, $f_7$, as shown in FIG. 1. Moreover, the UEs 104 each communicate with the base station 102 using a plurality of UL channels 103.1, 103.2, 103.3, 103.4, 103.6, and 103.7, each of which may operate at a particular UL frequency $f_1$, $f_2$, $f_3$, $f_4$, $f_6$, $f_7$ as shown in FIG. 1. Again, the various UL and DL channel frequencies may be associated with carrier frequencies, for example, used to provide communications between the base station 102 and the UEs 104 such that the base station 102 may service the UEs 104. For clarity, the reference numbers for the UL channels 103 and DL channels 105 use a naming convention that matches their respective frequencies as shown in FIG. 1. It is noted that the frequency allocation as shown in FIG. 1 assumes that the UE frequency grouping and frequency allocation in accordance with the aspects described herein has already been applied, the details of these processes being further discussed below.

Furthermore, and for ease of explanation, the UEs 104.1-104.6 are alternatively referred to herein with reference to the subscript notations i, j, k, s, p, and q as shown in FIG. 1 such that the UEs 104.1, 104.2, 104.3, 104.4, 104.5, and 104.6 are identified with the UEs: $UE_i$, $UE_j$, $UE_k$, $UE_s$, $UE_p$, and $UE_q$, respectively. These subscripts are used throughout this disclosure with reference to the various mathematical calculations and modeling used to illustrate how the base station 102 may execute the aspects as described herein. For instance, in an aspect, the base station 102 may receive, via communications with the UEs 104, geographical location information (e.g. geographical coordinates) from each one of any suitable number N of UEs 104 within communication range (e.g. UEs 104.1-104.6). This geographical location information may be obtained in accordance with any suitable techniques, including known techniques to do so. For instance, the base station 102 may obtain the geographical location information for each of the UEs 104 by utilizing standard UE positioning methods from 3GPP or other suitable protocols or standards. Since these techniques are adopted by 3GPP or other suitable standards, using these techniques provides reliable position information with very good accuracy.

Thus, once the geographical location information is obtained, let $d_i$ denote the location of $UE_i$ with respect to base station 102 in coordinates (x, y, z) in a broadcast range of the base station 102, which may be represented as $R^3$. As further discussed herein, the base station 102 may be implemented or otherwise operate using any suitable number and/or type of processors, executable instructions, etc. Thus, as discussed herein, it is understood that a reference to a mathematical or other functions being performed by the base station 102 may be performed by the relevant portions of the base station 102 that are configured to carry out such functions, such as computer processors or other suitable hardware and/or software components.

Thus, and with continued reference to FIG. 1, from this location information of all UEs 104, the base station 102 may determine the Euclidean distance ($d_{ij}$) between each $UE_i$ and $UE_j$ ($1 \le i$; $j \le N$ ($i \ne j$)) and populate a N×N Euclidean distance matrix A in Equation 1, with N being the number of UEs, as follows:

$$A = \begin{bmatrix} d_{11} & d_{12} & \ldots & d_{1N} \\ d_{21} & d_{22} & \ldots & d_{2N} \\ \vdots & \vdots & \ddots & \vdots \\ d_{N1} & d_{N2} & \ldots & d_{NN} \end{bmatrix} \quad (1)$$

The use of the indices i and j in this context should not be interpreted as only applying to the UEs 104.1 and 104.2 as shown in FIG. 1. Instead, and as defined immediately above, the indices i and j are used in this mathematical context to represent a distance between each pair of UEs of a number N of total UEs 104 (e.g. a distance between each combination of UE pairs from among UEs 104.1-104.6 using the example shown in FIG. 1). Thus, it is noted that the Euclidean distance matrix A in (1) is a square symmetric hollow matrix with zero diagonal elements (i.e. the distance between the same UE such as UE 104.1 and 104.1 is not valid). Thus, aspects include the base station 102 calculating each element in the Euclidean distance matrix A as to represent a distance between each combination of UE pairs serviced by the base station 102, excluding self-pairings as noted above. In other words, the Euclidean distance matrix A represents values for the physical distance between each combination of the UEs 104 serviced by (e.g. within the communication range of) the base station 102, with the Euclidean distance matrix A having dimensions N×N, N being equal to the number of UEs 104. Additional details regarding the mathematical formation of the resource allocation problem to which the aspects herein are directed are provided in Appendix A.

Qualification of UEs for Frequency Sharing

Again, the aspects described in further detail herein implement frequency sharing among UEs 104 in accordance with an allocation algorithm to maximize (or at least increase) sum-SE in cellular networks, such as the cellular network 100 as shown and discussed with respect to FIG. 1, for instance. In an aspect, the frequency sharing mechanism utilizes an evaluation of one or more conditions and/or criteria to initially identify a set of qualifying UEs that could be candidates for utilizing channel frequency sharing between one another to communicate with the base station 102. These qualifying UEs thus function as the set of UEs within the cellular network 100, which may be grouped into UE frequency sharing groups of two or three UEs, for example, with frequencies being allocated within these groups to facilitate frequency sharing.

A. The Use of a Threshold Distance Value

Figure 2A:
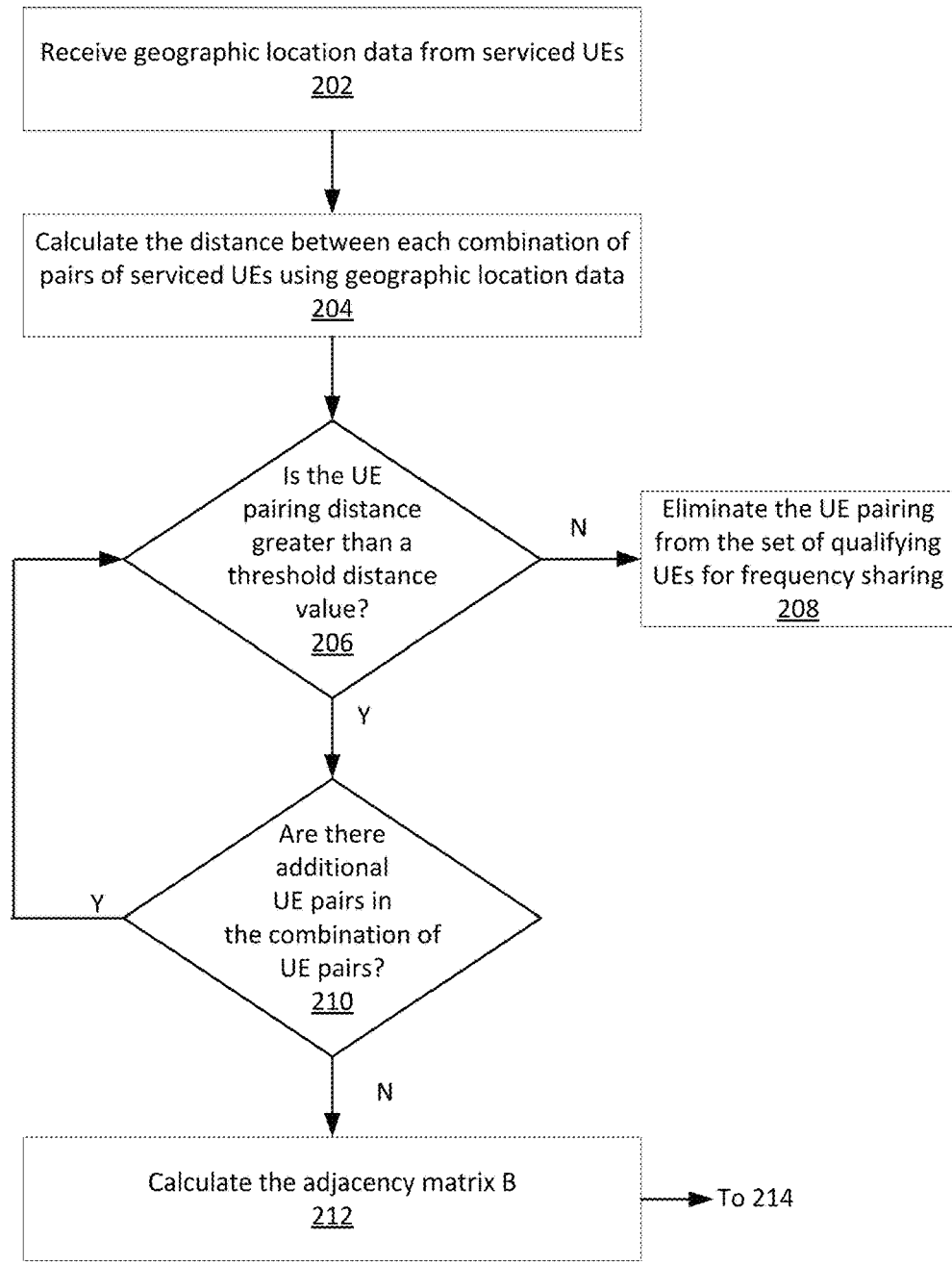
FIG. 2A illustrates an example flow for selecting a set of qualifying UEs for utilizing channel frequency sharing between one another, in accordance with one or more aspects of the present disclosure.

FIG. 2A illustrates an example flow for selecting a set of qualifying UEs for utilizing channel frequency sharing between one another, in accordance with one or more aspects of the present disclosure. The evaluation of the various conditions used to identify a set of qualifying UEs are further discussed below, with the first condition being the evaluation of a geographical distance between each of the UEs 104 as discussed above with respect to the calculation of the Euclidean distance matrix A. The aspects discussed herein recognize that the sidelink (SL) interference between UEs 104 is the result of one of the UEs 104 transmitting via an uplink channel, which may interfere with another UE 104 when receiving via a downlink channel using the same (i.e. shared) frequency. This SI will, however, be less for UEs that are positioned further from one another but still within the coverage range of the base station 102, due to path losses.

Therefore, aspects include the base station 102 calculating a threshold distance value among UEs 104, which may be referred to herein as a minimum distance value or a threshold distance value representing the sufficient distance of separation between UEs, which may be equivalent to or based upon $d_{min}$, as further discussed herein. Thus, aspects include the set of qualifying UEs 104 being determined such that, from among the UEs 104 within range of the base station 102, only those UEs 104 that are separated from one another by a distance that exceeds the threshold distance value are selected.

For example, and as shown in FIG. 2, aspects include the base station receiving (block 202) geographical location data from each of the services UEs 104. The base station 102 may then calculate (block 604) the distance between each combination of UE pairs 104 serviced by the base station 102. This may include, for instance, calculating the Euclidean distance matrix A as discussed above with reference to (1). The base station 102 may then calculate (block 206), for a particular UE pairing in the Euclidean distance matrix A, whether the distance of separation between those two UEs 104 is greater than the threshold distance value. Again, the determination of this threshold distance value is further discussed herein. In any event, the base station 102 may then proceed to eliminate (block 208) any pairing of UEs 104 that are less than this threshold distance value, or otherwise proceed to make this determination (block 206) for each UE pairing of the overall combination of UE pairings until each UE pairing has been analyzed in this manner (block 210). Once completed, the adjacency matrix B may be calculated (block 212) by representing matrix elements associated with UE pairings that were eliminated (block 208) from the set of qualifying UEs for frequency sharing as a '0,' while representing matrix elements associated with the other UE pairings (i.e. the set of qualifying UEs for frequency sharing) as a '1.'

However, other factors such as bad radio channel conditions and the random nature of the wireless channel could also make the decoding task at UEs more challenging. Thus, the aspects described herein also address other conditions in addition to or instead of the evaluation of the distance between UEs to select qualifying UEs to prevent UEs that are not part of the qualifying UEs from frequency sharing, even if the UEs meet the threshold distance value criterion (block 206), to avoid further performance degradations. Thus, to account for different scenarios, the aspects described herein introduce additional measures to enable/disable frequency sharing per UE, i.e. only allowing those UEs that are part of the set of qualifying UEs to be eligible for frequency sharing. As further discussed below, the identified set of qualifying UEs may change over time, particularly when UEs are moving within the range of the base station 102, which is commonly the case. Thus, the adjacency matrix B may be calculated (block 212) in accordance with any suitable schedule (e.g. every TTI, when a number of TTIs have elapsed, or during any suitable schedule) by imposing these various constraints discussed herein.

The selection of the threshold distance value may be performed in accordance with any suitable techniques depending upon the particular application, communication protocols, size of the range of coverage of the base station 102, the type of the base station 102, the particular environment or region, etc. For example, even for a fixed distance separation between two UEs 104 such as $UE_i$ and $UE_j$, the UE-to-UE in-band interference power, also called as SL power at $UE_i$ caused by UL signal from $UE_j$, may vary randomly due to fading and other channel impairments. These path loss variations over different propagation environments have been extensively studied and empirically modeled using the shadowing effect ($X_{os}$) in literature. Thus, aspects include determining an initial minimum Euclidean distance $d_{min_{initial}}$ as a separation required between two UEs 104 (e.g. $UE_i$ and $UE_j$) without considering this shadowing effect. Then, an additional distance offset, denoted as $d_{min_{offset}}$, may be introduced to account for this randomness of interference caused by other UEs 104 due to shadowing. The final threshold distance value used as the threshold distance value may then be calculated as the sum of $d_{min_{initial}}$ and $d_{min_{offset}}$.

Continuing this example, for a given UL transmit power from a UE 104 (e.g. $UE_j$) the SL path loss model described above may be used by the base station 102 to estimate the SL power at UE, on a particular frequency f. Modeling the shadowing effect in (11) as $X_{o_s} \sim N(0, \sigma_s^2)$, this SL power at $UE_i$ on f may be measured, for example, via any suitable number and type of simulations over a particular period of time and/or number of communicated frames (e.g. 1000 or more LTE frames) to determine its cumulative distribution function (CDF). An example of the CDF calculated in this manner in shown in FIG. 14, which shows CDF plots for a wide range of $\sigma_s$, recommended by 3GPP, covering different BS classes and propagation environments.

Considering only $d_{min_{initial}}$ as discussed above for PL in (12), it can be observed in FIG. 14 that the SL power received at a UE 104 (e.g. $UE_i$) on f may be much higher than its reference sensitivity (REFSENS), i.e., even more than 20 dB due to the shadowing effect. To account for this randomness, $\sigma_s$ specific $d_{min_{offset}}$ (from $$d_{min_{offset_1}}$$

to $$d_{min_{offset_5}}$$

Figure 14:
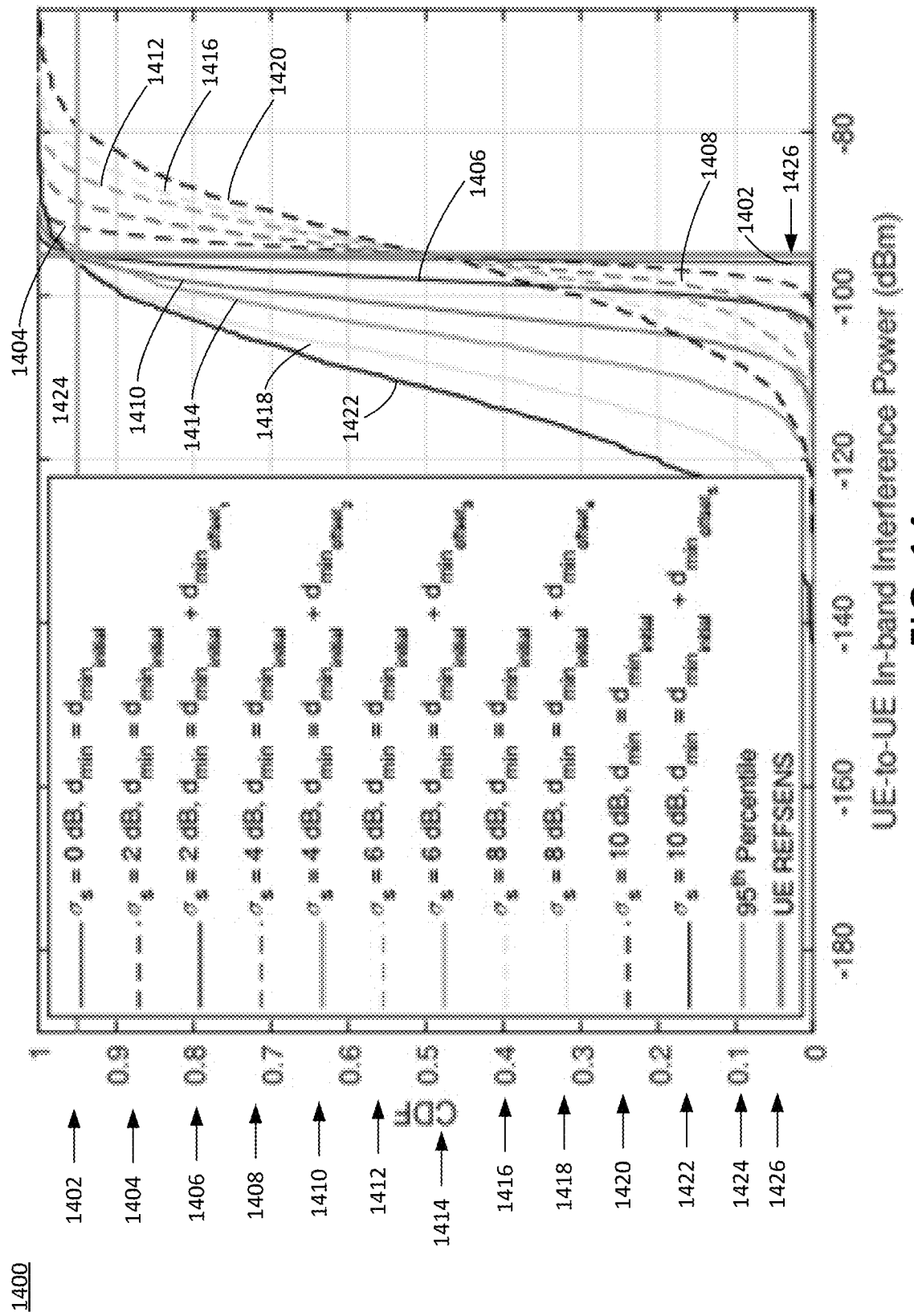
FIG. 14 illustrates CDF plots of SL interference power for different $\sigma_s$ and respective $d_{min_{offset}}$ values, in accordance with one or more aspects of the present disclosure.

) is introduced such that the 95$^{th}$ percentile of this SL power stays below the UE's REFSENS as shown in FIG. 14 to compute the final $d_{min}$ threshold. Parameters such as those shown in the Table 4 in Appendix D, for instance, may be used for this thresholding calculation.

Using the respective $d_{min}$ threshold as shown in FIG. 14, the elements of the frequency sharing matrix X defined above in (9) may thus be determined as:

$$x_{(i,j,\forall f \in F)} = x_{(j,i,\forall f \in F)} = \begin{cases} 1, & \text{if } d_{ij} \geq d_{min} \text{ and } i \neq j; \forall i, \forall j \in I \\ 0, & \text{if } d_{ij} < d_{min} \text{ and } i == j; \forall i, \forall j \in I \end{cases} \quad (14)$$

Continuing the example above, if a UE pairing example $UE_i$ and $UE_j$ are separated by $d_{min}$, it is assumed that both $p^s_{(j,i,f)}$ and $p^s_{(i,j,f)}$ will be below the UE's REFSENS at least for 95% of f's $\in F$. With this assumption, a 3-D matrix X in (14) may be transformed into a 2-D matrix B ($X \in \{0; 1\}^{N \times N \times F} \rightarrow B \in \{0,1\}^{N \times N}$) and its elements computed as:

$$b_{(i,j)} = \left( \frac{1}{|F|} \sum_{f \in F} x(i,j,f) \right) \begin{matrix} 1 \\ \gtreqless 0.95; \forall i, \forall j \in I \\ 0 \end{matrix} \quad (15)$$

Figure 9:
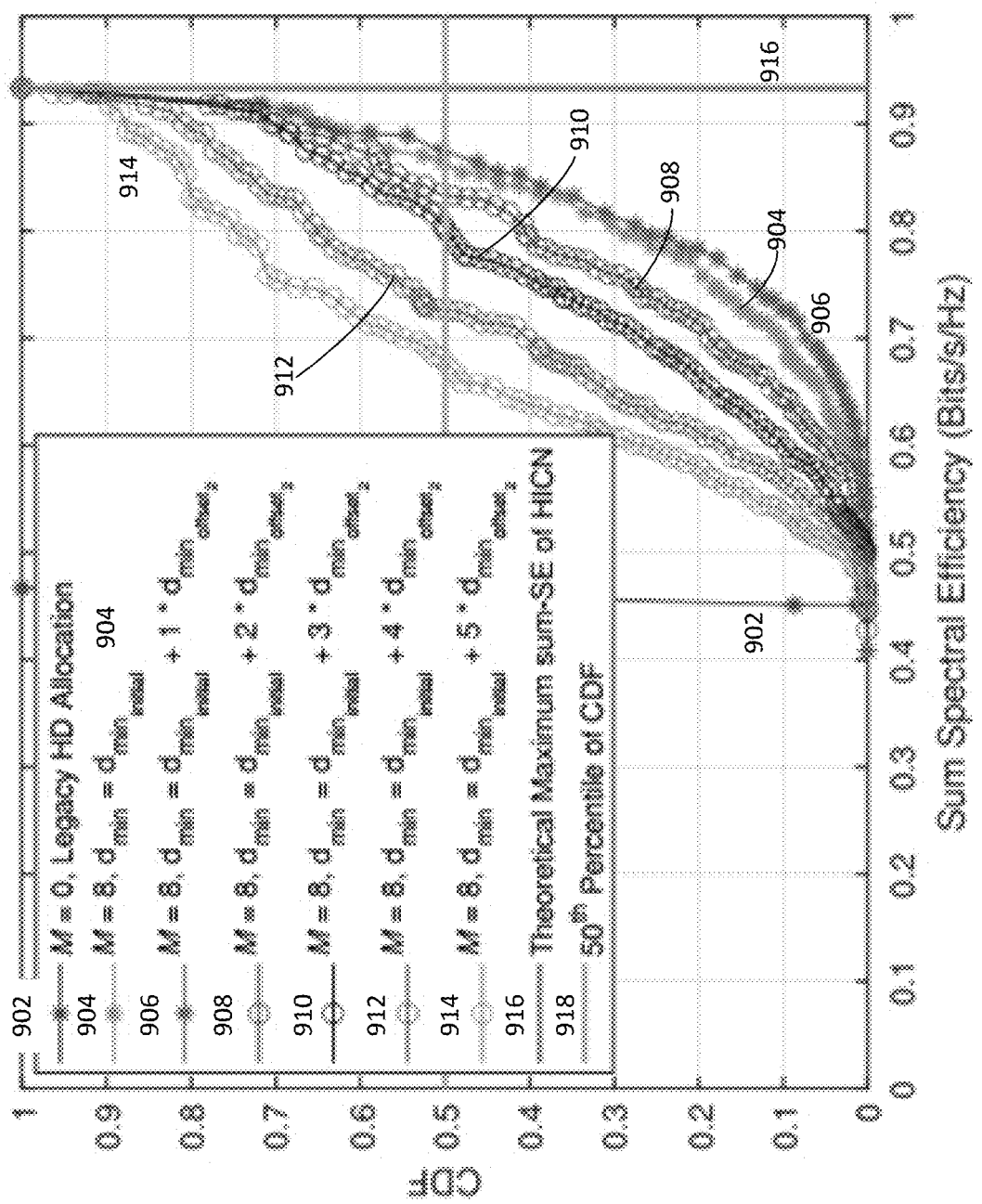
FIG. 9 illustrates an example cumulative distribution function (CDF) of sum-SE achieved for different $d_{min}$ thresholds at SNR=4 dB, M=N=8, and σs=4 dB, in accordance with one or more aspects of the present disclosure.

Turning now to FIGS. 9 and 14, the selection of an appropriate threshold distance value for block 206 is further clarified. For instance, FIG. 9 illustrates a graph of sets of CDF curves versus sum spectral efficiency values over a particular range. This set of curves corresponds to different selections of a $d_{min_{offset}}$ values, in which case it is demonstrated that the best result is for the curve 906, which introduces a $d_{min_{offset2}}$ factor to the initial $d_{min}$ value. Moreover, FIG. 14 illustrates the difference in reducing the UE-to-UE in-band interference power level when an additional offset value $d_{min_{offset2}}$ is added to the $d_{min_{initial}}$ represented in the curve 1408 to provide the curve 1410. Thus, such techniques may be implemented to determine the preferable choice for appropriate threshold distance value to be used in accordance with the aspects described herein.

Again, this process is one example in how the threshold distance value may be calculated, but the aspects herein are not limited to this example. Any threshold distance value may be calculated in accordance with any techniques, measurements, calibration processes, etc., to ensure that the set of qualified UEs is determined for frequency sharing, as further discussed herein.

In the aspects described herein, this calculation for the adjacency matrix B in (15), which may be performed at block 212 as shown in FIG. 2A, for instance, may be considered an initial version of the adjacency matrix B, which is further modified using additional constraints as discussed below and with reference to FIG. 2B. In other aspects, the flow shown and discussed with reference to FIG. 2B to further modify the adjacency matrix B is optional.

B. The Use of a Signal-to-Noise Ratio (SNR) or Signal-to-Noise Plus Interference Ratio (SINR) Threshold Value Additionally or alternatively, aspects include the base station 102 determining the set of qualifying UEs 104 based upon a measured SNR and/or SINR reported by a UE 104 while receiving signals via a DL channel 105 operating at a particular frequency. The SNR values of one or more of the UEs 104 may be reported during typical communications with the base station 102 via the UL channels 103, for instance. In an aspect, the base station 102 may optionally further narrow an initial set of qualified UEs that were identified using the threshold distance value criterion as noted above, for example, by applying a second criterion that establishes a threshold SNR or SINR value. In accordance with such aspects, the base station 102 may identify, from among the set of qualifying UEs 104 that are spaced from one another in excess of the threshold distance value, only those UEs 104 that also report a SNR or SINR that exceeds a threshold value. The SNR or SINR values may be reported over any suitable sampling period or schedule (e.g. one TTI or several TTIs).

Figure 2B:
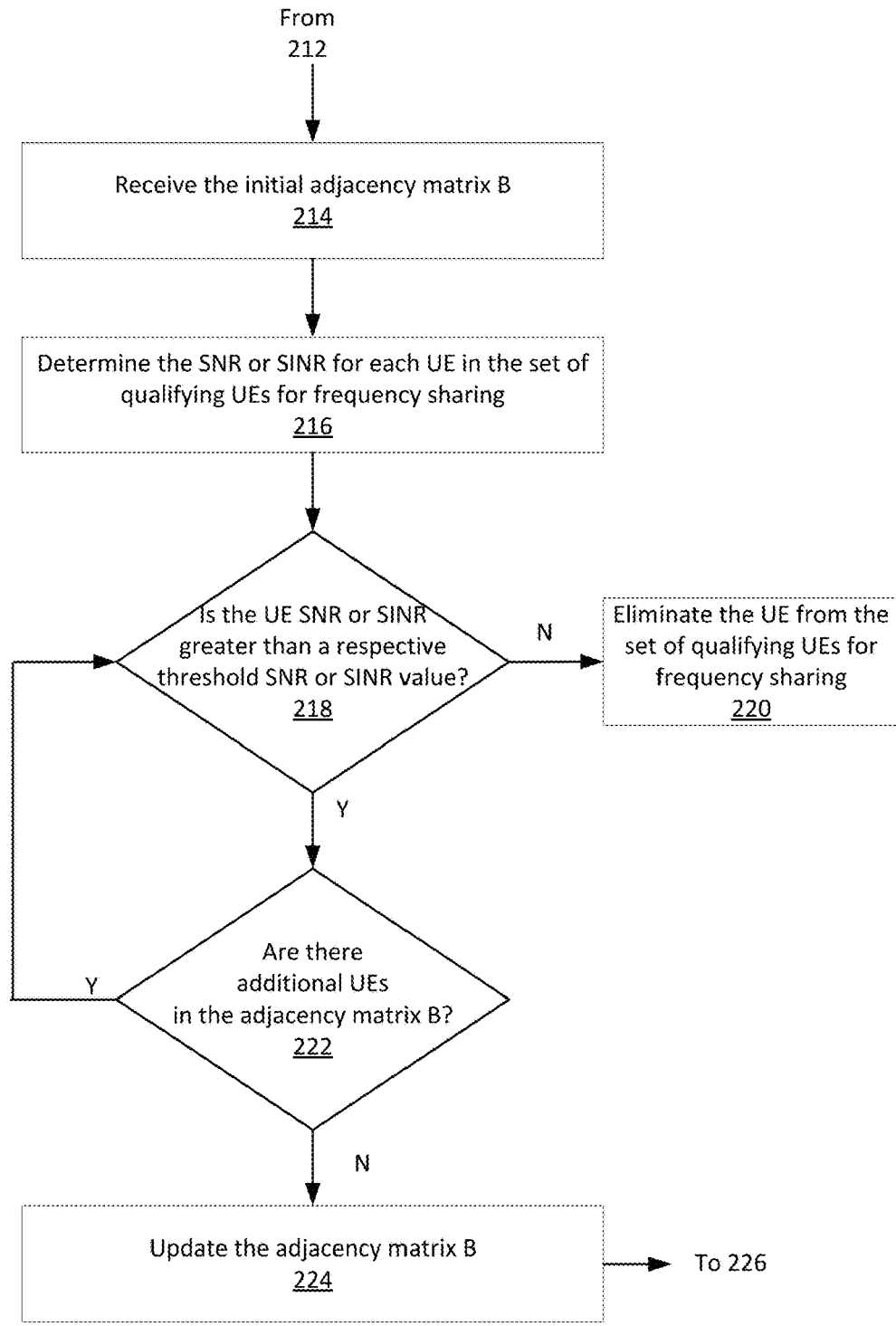
FIG. 2B illustrates an additional example flow for selecting the set of qualifying UEs for utilizing channel frequency sharing between one another using alternative or additional criteria, in accordance with one or more aspects of the present disclosure.

An example process flow for this technique is shown in FIG. 2B, which begins by receiving (block 214) the current adjacency matrix B as discussed above and with reference to the flow in FIG. 2A. The process as shown in FIG. 2B includes the base station determining (block 216), for each UE 104 still eligible for UE frequency sharing as indicated in the initial calculated adjacency matrix B, the SNR and/or SINR as reported by or determined from each UE. If it is determined (block 218) that a UE is operating in accordance with a SNR or SINR, as the case may be, in excess of an established predetermined threshold, then that UE may remain in the set of qualifying UEs for frequency sharing; otherwise the UE may be eliminated (block 220) from the set of qualifying UEs for frequency sharing. The SINR and/or SNR may be identified, for instance, by monitoring previous SNR and/or SINR reported by each UE 104, by executing a test procedure in which each UE periodically uses and tests each available DL frequency for the DL channel 105 and reports the measured SNR and/or SINR, etc. This reporting of SNR and/or SINR may be performed, for instance, in accordance with an applicable standard (e.g. 3GPP), which may define such techniques for obtaining these metrics to ensure compliance requirements are met during operation. This process may then be repeated (block 222) for each UE in the current set of qualifying UEs for frequency sharing as indicated in the initial adjacency matrix B, at which time the initial adjacency matrix B is updated (block 224) to include only those UEs that also pass the SNR or SINR criteria.

As an example, the base station 102 may define a N×1 vector $\Psi=[\psi_1, \psi_2, \ldots, \psi_N]^T \in \{0,1\}$, where $\psi_i$ denotes a binary condition to enable/disable each UE 104 ($UE_i$ in this example) for frequency sharing based on the SNR or signal-to-noise plus interference ratio (SINR) that the UE 104 experiences. Using the DL SINR estimated from (8), $\psi_i$ may be determined as:

$$\psi_i = \left(\frac{1}{|F|}\sum_{f\in F}\zeta^d_{(i,f)}\right) \begin{matrix} 1 \\ \gtreqless \zeta^d_{th}; \forall i \in I \\ 0 \end{matrix} \quad (16)$$

where, $\zeta^d_{th}$ is the minimum operating SNR of a UE (in linear scale) as mandated by 3GPP in for a given use case. Using $\psi_i$ from (16), elements of B (the initial adjacency matrix) from (15) may then be updated as:

$$b_{(i,\forall j\in I)} = b_{(\forall j\in I,i)} = \psi_i b_{(i,\forall j\in I)}; \forall i\in I \quad (17)$$

Of course, the aspects described herein may calculate the SNR or SINR in any suitable manner, and is not limited to the aforementioned examples.

C. The Use of ACK/NACK Reports

Additionally or alternatively, aspects include the base station 102 determining the set of qualifying UEs 104.1-104.3 based upon the ACK and/or NACK reports transmitted by a UE 104 via the UL channels 103, with respect to signals received via the DL channels 105. The ACK and/or NACK reports may be communicated by one or more of the UEs 104 during typical communications with the base station 102 via the UL channels 103, for instance. In an aspect, the base station 102 may optionally further narrow an initial set of qualified UEs that were identified using the threshold distance value criterion as noted above, for example, by applying a third criterion that establishes a threshold number of NACK reports from a particular UE 104 over a specific reporting window (e.g. one or more TTIs). In accordance with such aspects, the base station 102 may identify, from among the set of qualifying UEs 104 that are spaced from one another in excess of the threshold distance value, only those UEs 104 that also report a number of NACKs less than a threshold number (e.g. 1 NACK). The use of the ACK/NACK criterion may be in addition to or instead of any combination of the other criteria discussed herein to identify the set of qualifying UEs. As an example, the base station 102 may apply each of the criteria (the threshold distance value, the SNR or SINR threshold requirement, and the NACK requirement) to determine the set of qualifying UEs.

Figure 2C:
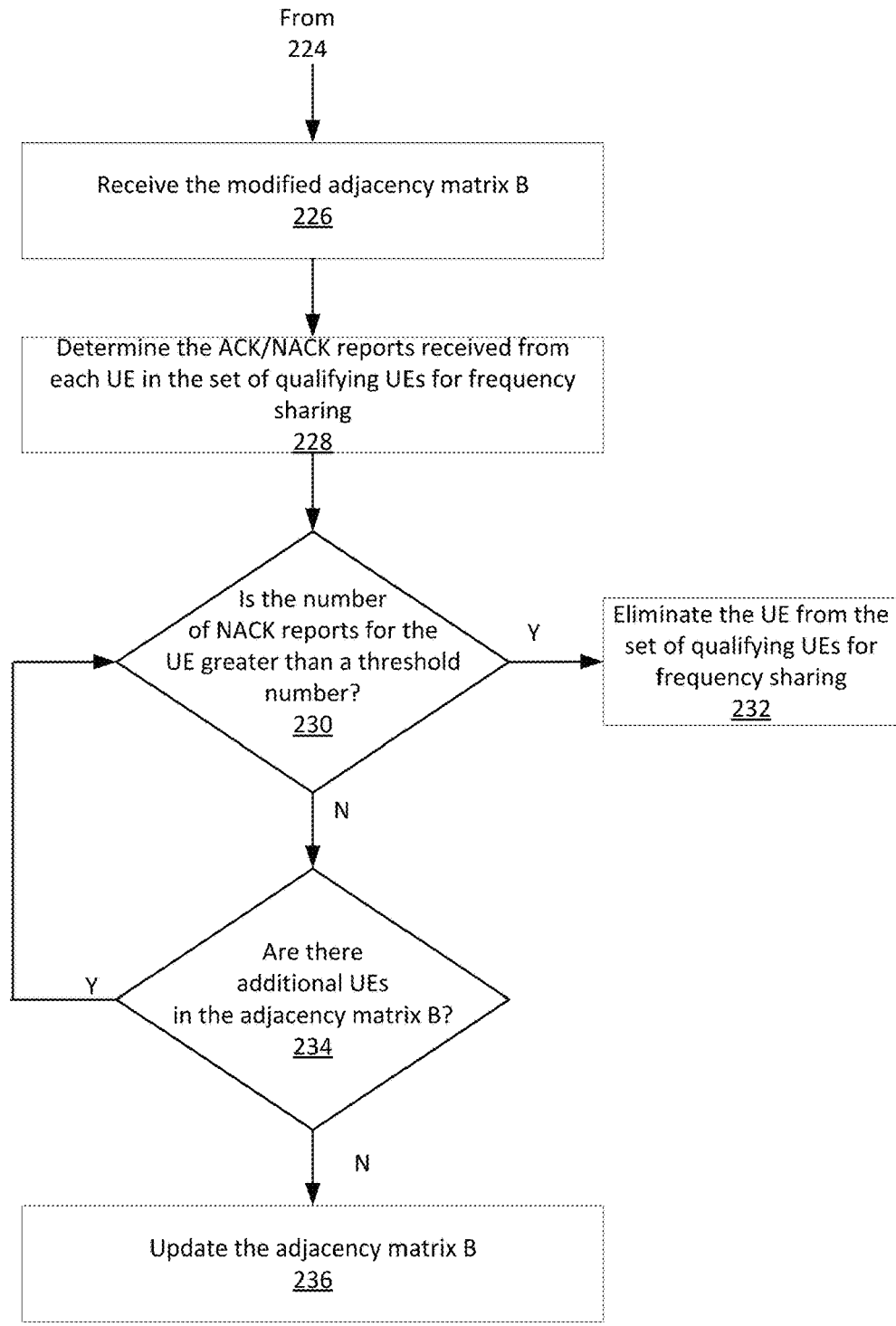
FIG. 2C illustrates an additional example flow for selecting the set of qualifying UEs for utilizing channel frequency sharing between one another using alternative or additional criteria, in accordance with one or more aspects of the present disclosure.

An example process flow for this technique is shown in FIG. 2C, which begins by receiving (block 226) the current adjacency matrix B as discussed above and with reference to the flow in either FIG. 2A (using the threshold distance criterion) and/or FIG. 2B (using the SNR or SINR criterion), in various aspects. The process as shown in FIG. 2C includes the base station determining (block 228), for each UE 104 still eligible for UE frequency sharing as indicated in the initial calculated adjacency matrix B, the number of ACK and/or NACK reports as reported by or determined from each UE. If it is determined (block 230) that the number of NACK reports is less than an established predetermined threshold (e.g. one per TTI or any established predetermined number occurring within any suitable time period), then that UE may remain in the set of qualifying UEs for frequency sharing; otherwise the UE may be eliminated (block 232) from the set of qualifying UEs for frequency sharing. This process may then be repeated (block 234) for each UE in the current set of qualifying UEs for frequency sharing as indicated in the initial adjacency matrix B, at which time the initial adjacency matrix B is updated (block 236) to include only those UEs that also pass the NACK threshold number criteria.

The use of LTE-A is provided in this section as an illustrative example, although the aspects are not limited to this example and the ACK/NACK creation may be implemented in accordance with any suitable type of communication protocol. For instance, in LTE-A information bits are communicated in the form of Transport Blocks (TBs) between UEs and base stations, and a maximum of two TBs ($TB^1_j$, $TB^2_j$) can be sent to/received by a UE 104 (e.g. $UE_j$) in a TTI. Based on the decoding status, the $UE_j$ in this example sends Acknowledgment (ACK) for decoding success and Negative ACK (NACK) for decoding failure for each TB to the base station 102 in every TTI. These ACK/NACK reports from UEs 104 may be used to compensate for the random nature of the wireless channel. Accordingly, aspects include the elements of the adjacency matrix B in (17) being updated in block 236 as follows:

$$b_{(i, \forall j \in I)} = \tag{18}$$
$$b_{(\forall j \in I, i)} = \begin{cases} b_{(ij, \forall j \in I)}, & \text{if } ACK \text{ received for } TB^1_i \text{ and } TB^2_i; \forall\ i \in I \\ 0, & \text{if } NACK \text{ received for } TB^1_i \text{ or } TB^2_i; \forall\ i \in I \end{cases}$$

Thus, regardless of the number and/or combination of the various criteria discussed herein to determine the set of qualifying UEs for frequency sharing, the adjacency matrix B in (18) contains all information necessary to enable frequency sharing among UEs 104 and forms the basis of the frequency allocation algorithm, as further discussed below. The Selection of UE Groups for Frequency Sharing In this way, the three constraints discussed above for the threshold distance requirement, the SNR or SINR threshold requirement, and the NACK requirement (e.g. represented in (15), (17) and (18), respectively) may be utilized to enable/disable frequency sharing among the UEs 104 in the cellular network 100.

Again, the adjacency matrix B represents a set of binary values that indicate the set of qualifying UEs for frequency sharing. In other words, the binary values contained in the adjacency matrix B represents, for each UE-to-UE pairing from among the UEs 104, UE pairings that are eligible to be grouped together for frequency sharing based upon the aforementioned criteria. The binary values in the calculated adjacency matrix B at any particular point in time may be referred to herein as a set of metrics or matrix values, which may be correlated with one another as discussed in further detail below by the base station 102 to determine whether a new UE grouping and/or frequency allocation among the UEs 104 should occur. This section provides additional detail with respect to how the qualifying set of UEs may be grouped together for this purpose. For instance, a '1' at any arbitrary indices i; j∈I (i≠j) of the adjacency matrix B in (18) indicates that a respective pair of UEs are eligible to share frequencies, and thus requires only two frequencies. It is noted that the use of indices i and j in this context is with respect to any element in the adjacency matrix B by way of example, and is not limited to only the two UEs 104.1, 104.2 as shown in FIG. 1 but may apply to any of the UEs 104.

As an illustrative example, the UE pair 104.5, 104.6 as shown in FIG. 1 use one frequency ($f_6$) for both the UL channel 103.6 of the UE 104.5 as well as the DL channel 105.6 of the UE 104.6, after allocation of these frequencies as further discussed herein. Another frequency ($f_7$) is also used for the DL channel 105.7 of the UE 104.5, as well as the UL channel 103.7 of the UE 104.6. However, every un-grouped UE 104 by itself requires two distinct frequencies for UL and DL. Aspects include also grouping more than two UEs 104 together for frequency sharing, provided their respective UE pair elements from (21), as further discussed below, are set to '1' in the adjacency matrix B. In an aspect, the base station 102 may implement a UE grouping algorithm to identify, from among the qualifying set of UEs, such independent UE groups, contributed by disjoint sets of UEs 104, with a goal of maximizing the number of grouped UEs (M). The performance of the UE grouping algorithm is characterized by the frequency sharing efficiency (n) defined as follows:

$$\eta(\%) = \frac{N}{M + 2Q} \times 100 \tag{19}$$

The details of this metric are further discussed below with additional example scenarios. However, from (19) it is observed that as M increases to the total number N of the UEs within a range serviced by the base station 102 (M→N), n also increases proportionally, since the number of un-grouped UEs (Q) decreases by a factor of 2. Moreover, for a legacy HD system (M=0, Q=N), η stands at a lower bound of 50%, while for a complete IBFD system (M=N, Q=0), where both BS and UEs are IBFD capable, n attains the upper bound of 100%.

A. Smaller Vs. Higher Length UE Group

Let the number of UEs in a UE group be denoted as its length, which may vary from 2 to N in a cellular network (e.g. a HICN). In this section, the likelihood of identifying a UE group from B in (18) with any arbitrary length is discussed.

Lemma 1: For two sets $D_{C_1}$ and $D_{C_2}$ that contain the respective UE pair elements of the adjacency matrix to form UE groups of lengths $C_1$ and $C_2$ such that $C_1 < C_2$, their UE grouping probability will be related by $p(D_{C_1}) > p(D_{C_2})$.

Proof: Let a set D containing only the upper triangular elements of B in (18), with cardinality $|D|=N(N-1)/2$, is defined as follows:

$$D = \{b_{12}, \ldots b_{1N}, b_{23}, \ldots, b_{2N}, \ldots, b_{N-1N}\} \tag{20}$$

For a UE group of length C(C≤N), at least the elements of the set Dc in (21) should be '1'

$$D_C = \{b_{ij}, b_{jk}, \ldots, b_{lm}, b_{im} \in D\} \tag{21}$$

with $|D_C|=C$ there can be $$\binom{N}{C}$$

different UE groups of length C possible with probability:

$$p(D_C) = \begin{cases} \frac{2^{(N(N-1)/2-C)}}{2^{(N(N-1)/2)}} = \frac{1}{2^C}, & \text{if } C \geq 3 \\ \frac{2^{(N(N-1)/2)} - 1}{2^{(N(N-1)/2)}}, & \text{if } C = 2 \end{cases} \quad (22)$$

From (22), it can be concluded that if $C_1 < C_2$, then $p(D_{C_1}) > p(D_{C_2})$ and it means that a UE group with smaller length is more likely to occur than a higher length UE group.

B. UE Grouping Options

Since a UE group with higher length is less likely, as proved in Lemma 1, smaller length UE groups like three (Triplet) and two (Twin) are the preferred choice. Thus, the aspects described herein use Twins and Triplet groupings as the primary examples, but this is my way of example and not limitation, and the aspects described herein may use any suitable grouping scheme, with any suitable number of UEs being grouped together in the same manner as the twin and triplet groupings.

Lemma 2: Grouping N UEs as multiple Triplets and Twins is more likely than as a single group.

Proof: Similar to Dc in (21), let $D_{tr}$ and $D_{tw}$ be the sets with $|D_{tr}|=3$ for a Triplet and $|D_{tw}|=1$ for a Twin respectively. Using (22), sum of probabilities of K Triplets and L Twins shall be as follows:

$$p(D_{tr})K + p(D_{tw})L > p(D_N); 3K + 2L \leq N \quad (23)$$

The Eqn. (23) above thus proves that grouping N UEs as independent Triplets and Twins is more advantageous, and additional detail with respect to the mathematical calculation in this regard is described in further detail in Appendix B.

Triplets Identification

In an aspect, the base station 102 may model the cellular network 100 as an undirected graph to formulate the adjacency matrix B. To do so, all number N of UEs 104 served by the base station 102 may constitute an undirected graph G (V, E). Each UE 104 may denote a vertex in the vertex set $V = \{v_1, \ldots, v_N\}$, with an edge set $E \subseteq V \times V$ connecting these vertices. The adjacency relationship among all vertices are then captured in an adjacency matrix B having off-diagonal elements set to '1' when the adjacency requirements between their corresponding vertices are met, and to '0' otherwise, while the diagonal elements are always set to '0'. This adjacency matrix B also possesses similar characteristics as that of the Euclidean distance matrix A in (1). Since UEs 104 are treated as vertices, and the frequency sharing possibility between UEs 104 may be mapped as an adjacency relationship, the cellular network 100 may be modeled as an undirected graph. This modeling greatly helps to utilize the tools and techniques from graph theory to analyze and group UEs more efficiently.

In graph theory, a cycle in an undirected graph G (V, E) consists of three or more vertices connected in a closed chain, and it can be identified using either Depth First Search (DFS) or Breadth First Search (BFS) algorithm. Since the HICN 100 is mapped as an undirected graph G (V, E), a UE group of length C can be treated as a cycle with C vertices. Considering that a Triplet is a smallest cycle with only three vertices, i.e., C=3 in (21), the base station 102 may implement the same DFS or BFS algorithm, for example, to identify the Triplets from the adjacency matrix B in (18), i.e. from the set of qualifying UEs 104. Alternatively, the base station 102 may implement alternative means such as a brute-force search, for instance, to identify all Triplets present in the adjacency matrix B. An example of an identified Triplet is shown in FIG. 1 as the UEs 104.1, 104.2, 104.3.

Twins Identification

Graph coloring is a technique from graph theory that makes use of the adjacency matrix of G (V, E) to color its vertices. The main constraint in graph coloring is that no two adjacent vertices are colored using the same color. However, a color can be assigned to as many vertices possible, provided they are non-adjacent to each other. The smallest number of colors needed to color a graph is referred to as its chromatic number and is often denoted as $\chi(G)$. In an aspect, the base station 102 may implement a modification to this traditional graph coloring technique for Twins identification. As per this change, a color can be at the maximum assigned to one pair of eligible UEs (i.e., a twin within the set of qualifying UEs 104). With this change introduced, the base station 102 may implement a "greedy" graph coloring algorithm as further discussed herein to identify all twins in B from (18). An example of an identified Twin is shown in FIG. 1 as the UEs 104.5, 104.6.

Triplets Versus Twins

Figure 3:
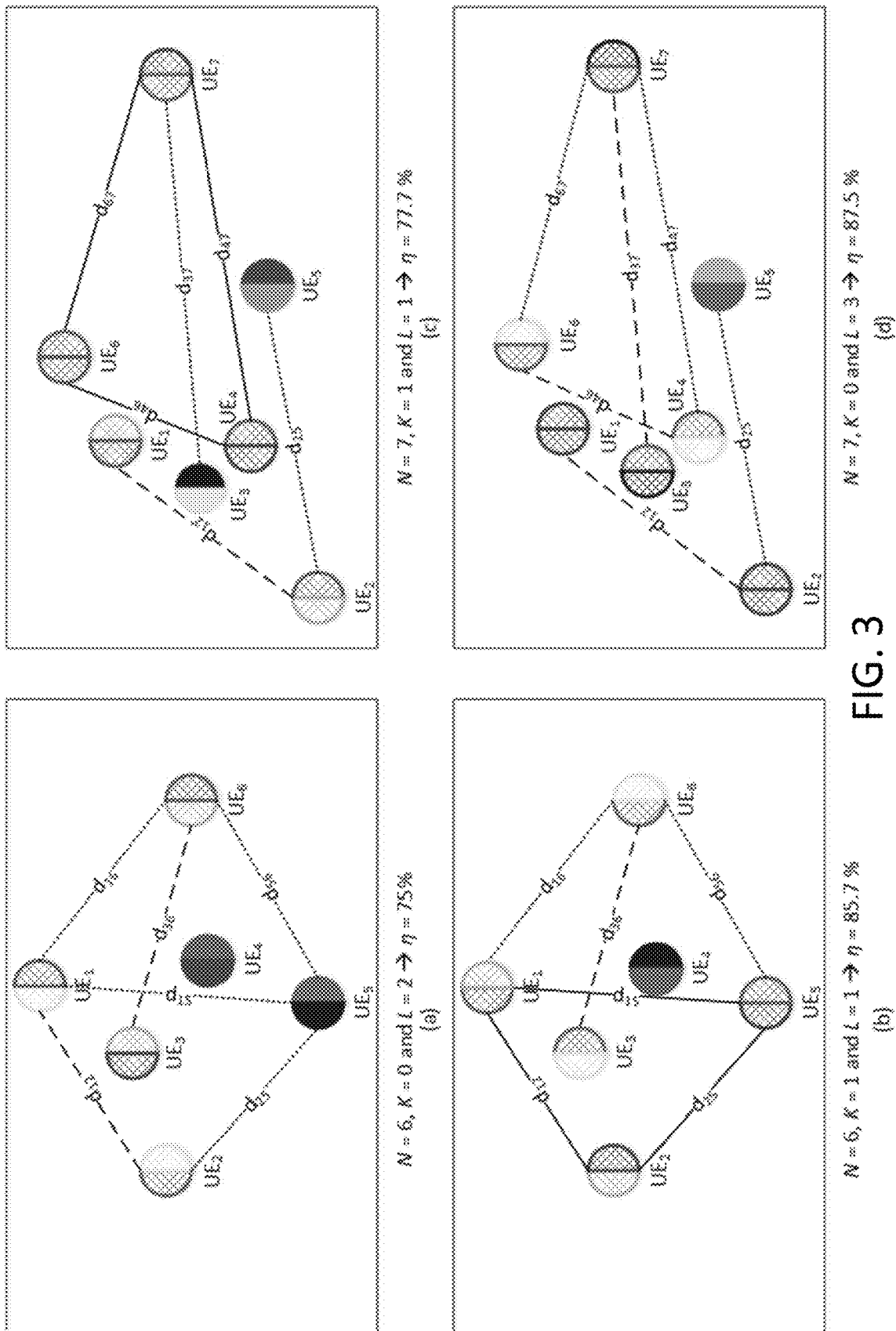
FIG. 3 illustrates examples of various scenarios of Twin and Triplet groupings and their corresponding frequency sharing efficiency (n), in accordance with one or more aspects of the present disclosure.
Figure 4:
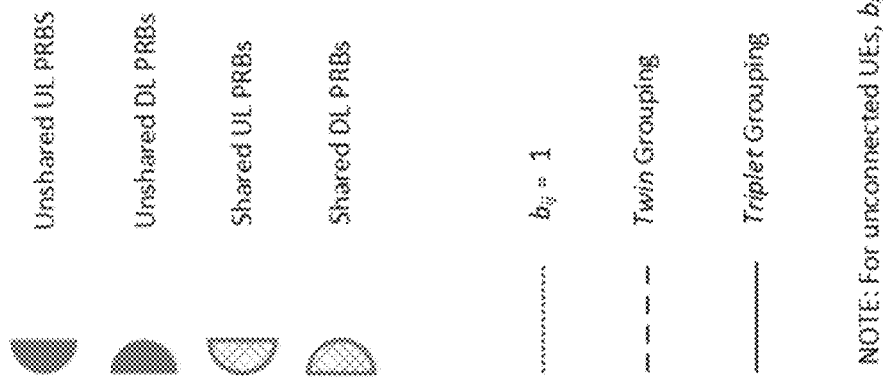
FIG. 4 illustrates a legend for the example scenarios as shown in FIG. 3, in accordance with one or more aspects of the present disclosure.

As discussed above, the base station 102 may identify Triplets and Twins from the set of qualifying UEs 104, which may be determined from the adjacency matrix B in (18). However, the particular combination of Triplets and Twins within a particular set of UEs 104 may result in different levels of performance. Thus, n from (19) may be implemented as a measure to identify an optimal combination of Triplets and Twins from the set of qualifying UEs 104. FIG. 3 thus illustrates an example of various scenarios of Twins and Triplets, with FIG. 3 illustrating various scenarios and FIG. 4 providing the legend for those shown in FIG. 3. As shown in FIG. 3, an even N(=6) and odd N(=7) number of UEs 104 is shown, and the impact on n for different Triplets and Twins combinations.

Scenario (a) illustrates 6 UEs, with two Twins being identified and no Triplets, which results in M=4 and Q=2. This UE grouping choice achieves n of 75%. For the same number of UEs 104, the scenario (b) shows that a Triplet and a Twin combination achieves a higher n of 85.7%, since M becomes 5 and Q becomes 1 in this case. For the scenario (c), N=7, and a Triplet and a Twin is chosen resulting in n of 77.7% with M=5 and Q=2, while the scenario in (d) with 6 UEs uses two Triplets from the same adjacency matrix B, leading to an higher n of 87.5% with M=6 and Q=1. From these examples, it is evident that optimal Triplets and Twins maximize M.

Optimal (Triplets:Twins) Search Algorithm

Figure 5:
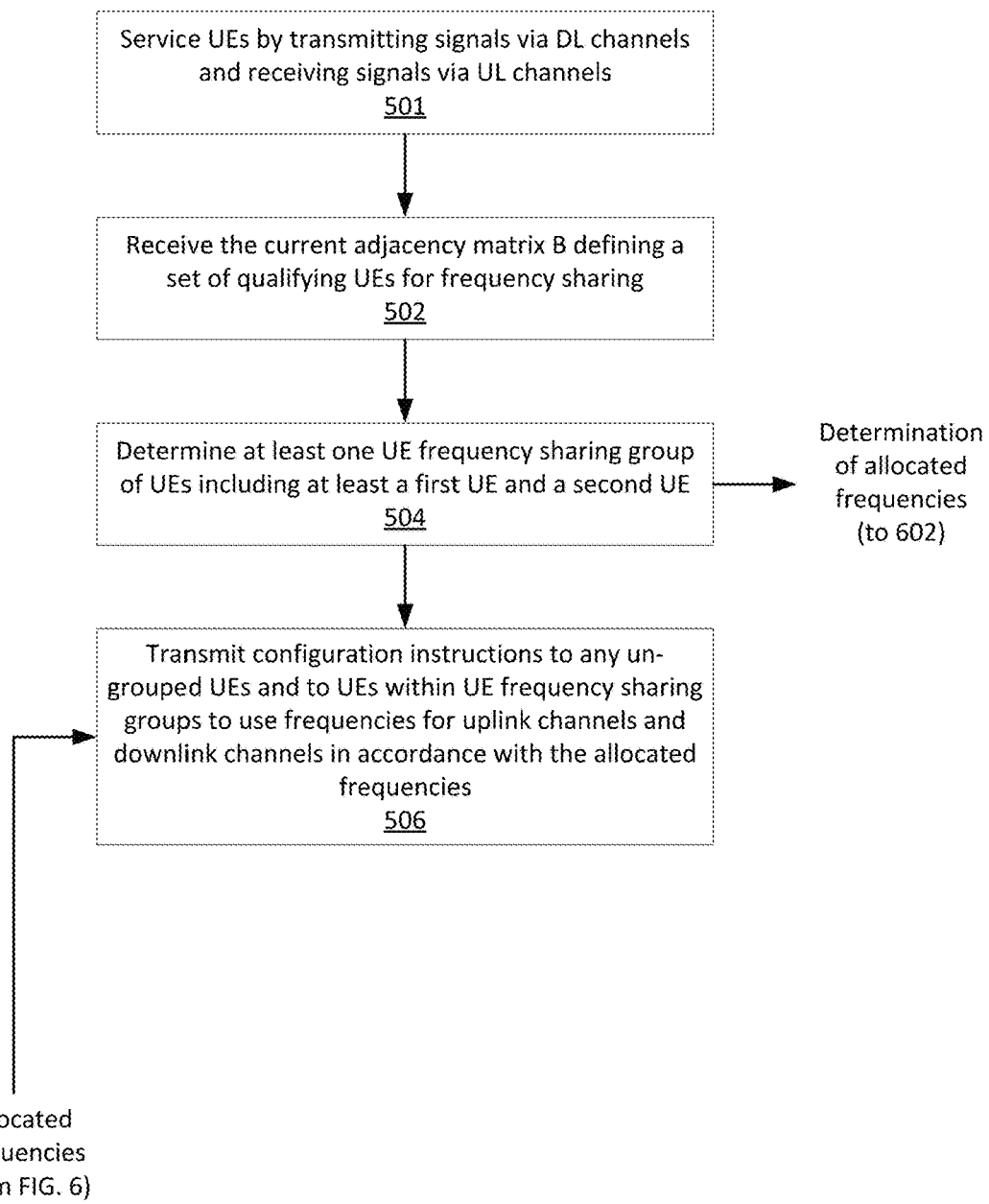
FIG. 5 illustrates an example flow for causing UE frequency sharing groups to operate in accordance with allocated shared channel frequencies, in accordance with one or more aspects of the present disclosure.

FIG. 5 illustrates an example flow for causing UE frequency sharing groups to operate in accordance with allocated shared channel frequencies, in accordance with one or more aspects of the present disclosure. The process 500 may begin with the base station 102 servicing (block 501) the UEs 104 as shown in FIG. 1 for example. The servicing of the UEs 104 may be performed, for instance, by the base station 102 transmitting signals to one of more of the UEs 104.1-104.6 using the DL channels 105, and receiving signals from one or more of the UEs 104.1-104.6 using the UL channels 103, with communication via these UL channels 103 and DL channels 105 facilitating the base station 102 servicing the UEs 104.

The process 500 as shown in FIG. 5 may be performed by the base station 102 to identify UE frequency sharing groups. To do so, the base station may calculate or otherwise receive (block 502) the current adjacency matrix B, as discussed herein with respect to FIGS. 2A-2C, for example.

The base station 102 may then determine (block 504) at least one UE frequency sharing group from the set of qualifying UEs 104 as indicated via the adjacency matrix B. In an aspect, this may include the base station 102 determining (block 504) each UE frequency sharing group from the from the set of qualifying UEs 104 as indicated via the adjacency matrix B.

To do so, aspects include the base station 102 implementing any suitable type of algorithm to identify optimal (Triplets:Twins) from the adjacency matrix B in (18) in accordance with the process provided below to maximize M. This optimal search algorithm is functionally divided into three stages as follows.

The first stage includes the identification of all possible independent-Triplets sets in the set of qualifying UEs represented by the adjacency matrix B. One such set is given, for example, in (26). Additional details regarding the execution of this first stage are provided below as follows.

Let $\chi$ denote the number of independent-Triplets sets and $K_1$ to $K_\chi$ carries the Triplets count in each set, respectively. The goal in this step is to identify all $\chi$ independent-Triplets sets and their respective counts from a N×N adjacency matrix B in (18). Then, let Y denote the number of Triplets present in B. When all elements of the set D in (20) are '1', then Y would reach to the maximum as:

$$\Upsilon = \binom{N}{3} \quad (33)$$

For the first independent-Triplets set, since $$T_{tr}^N = \binom{N}{3}$$

number of possibilities exist for the first Triplet, the very first possibility is chosen. After resetting the elements corresponding to the first Triplet in B, the remaining possibilities of Triplets in B reduces to $$T_{tr}^{N-3} = \binom{N-3}{3}.$$

Of these, again the very first possibility is chosen as the second independent Triplet. This process is repeated until the last independent Triplet of the first independent-Triplets set is identified. Considering all possible combinations of independent Triplets at every stage, $$\prod_{k=2}^{floor(\frac{N}{3})} T_{tr}^{N-3(k-1)}$$

number of independent-Triplets sets are identified until now. By choosing the second possibility from TY as the first Triplet, the search process similarly identifies another $$\prod_{k=2}^{floor(\frac{N}{3})} T_{tr}^{N-3(k-1)}$$

number of independent-Triplets sets. In a similar way, choosing the remaining possibilities of $T_{tr}^N$ as the first Triplet and continuing the rest of the search process, all $\chi$ independent-Triplets sets in B are identified and $\chi$ is computed as:

$$\chi \prod_{k=1}^{\lfloor N/3 \rfloor} T_{tr}^{N-3(k-1)} = \prod_{k=1}^{\lfloor N/3 \rfloor} \binom{N-3(k-1)}{3} \quad (34)$$

Finally, Triplets counts in each independent-Triplets set is updated respectively in $K_1$ to $K_\chi$.

The second stage includes, for every independent-Triplets set identified from the first stage, identifying the (k Triplets:l Twins) combination that achieves the highest M from all possible k:l combinations.

This may be performed, for instance, for the ith independent-Triplets set identified in Step 1 having Ki Triplets, starting with ($K_i$ Triplets:floor((N−3 $K_i$)/2) Twins) followed by ($K_i$−1 Triplets:floor((N−3($K_i$−1))/2) Twins) and so on until (0 Triplet:floor(N/2) Twins). If k denotes the number of Triplets in every search attempt from $K_i$ to 0, again $$\binom{K_i}{k}$$

number of choices of k Triplets are possible for every k. For every choice of k Triplets, l Twins are identified after resetting the elements corresponding to k Triplets in B. Among these search attempts, the (k Triplets:l Twins) combination that achieves the highest M is chosen, and this search is mathematically formulated as:

$$Z_{gr}^{i,k} = \bigcup_{p=1}^{k} Z_{tr}^p \cup \bigcup_{q=1}^{\lfloor (N-3k)/2 \rfloor} Z_{tw}^q; \quad (35)$$

$$(K_i \geq k \geq 0), (1 \leq i \leq \chi)$$

$$Z_{gr}^i = Z_{gr}^{i,m} \Big| m = \underset{k}{\mathrm{argmax}} |Z_{gr}^{i,k}|; \quad (36)$$

$$(1 \leq i \leq \chi)$$

The (k Triplets:l Twins) combination identified in (36) is then repeated for all i.

In the third stage, the best (k Triplets:l Twins) combination among all possible independent-Triplets sets from stage 1 is selected as the optimal (Triplets:Twins) choice. To do so, the best (k Triplets:l Twins) combination among all $\chi$ independent-Triplets sets identified in (36) is selected as the optimal (Triplets:Twins) combination as:

$$Z_{gr} = Z_{gr}^m \Big| m = \underset{i}{\mathrm{argmax}} |Z_{gr}^i| \quad (37)$$

During this search in stage 2 and stage 3, if a (k Triplets:l Twins) combination achieves M=N, then the search process is terminated and the respective combination is finalized as the optimal one.

Once the UE frequency groups are identified, the base station 500 may then transmit any suitable type of configuration instructions (e.g. 3GPP control information) to the UEs 104 (including un-grouped UEs) to cause each UE to operate in accordance with a set of allocated UL channel and DL channel frequencies, as discussed herein. For example, and with reference to FIG. 1 as an illustrative example, the configuration instructions may cause UE 104.1 to use a shared frequency ($f_1$) for an UL channel 103.1 from among the UL channels 103.1, 103.2, 103.3, 103.4, 103.6, and 103.7, while the UE 104.2 uses the shared frequency ($f_1$) for the DL downlink channel 105.1 from among the DL channels 105.1, 105.2, 105.3, 105.5, 105.6, and 105.7. The configuration instructions may thus inform each UE 104 that receives them to switch to the instructed UL and DL channel frequency. The base station 102 may determine the allocation of frequencies for each UE 104 via another process (e.g. algorithm), as discussed in further detail below with respect to FIG. 6.

Allocation of Frequencies to Selected UE Groups

Figure 6:
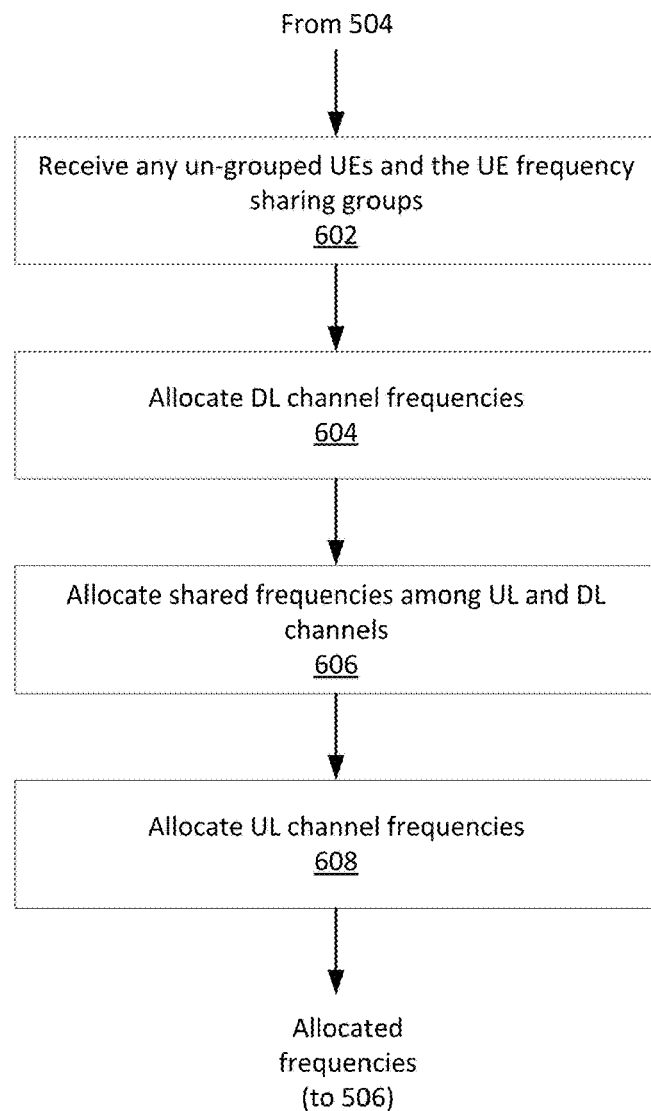
FIG. 6 illustrates an example flow for allocating frequencies, in accordance with one or more aspects of the present disclosure.

FIG. 6 illustrates an example flow for allocating frequencies, in accordance with one or more aspects of the present disclosure. As discussed above, in accordance with the aspects described herein, the base station 102 identifies a set of qualifying UEs 104 from among those serviced by the base station 102 that are eligible for frequency sharing between them using the adjacency matrix B. From among the identified set of qualifying UEs 104, the base station 102 may then determine specific UE frequency sharing groups, which may include combinations of UE Twins and UE Triplets, for example, as discussed above. Once the UE frequency sharing groups have been determined, the aspects described herein include the base station 102 allocating frequencies for use by each UE 104 as a DL channel and an UL channel, for both grouped and ungrouped UEs (i.e. each of the UEs 104 served by the base station 102). This process is further described in this section below, and may begin with the allocation of frequencies used for DL channels, followed by the allocation of shared frequencies, and finally the allocation of frequencies used for the UL channels. The aspects described herein assume channel reciprocity, and thus the UL and DL channel gains are considered as being the same for the purpose of the frequency allocation process.

The frequency allocation process as further discussed below references two different matrices: $X^d$ and $X^u$. Each of these matrices is a two-dimensional matrix having elements that assign downlink channel frequencies and uplink channel frequencies, respectively, for each UE 104 serviced by the base station 102. For example, the matrix $X^d$ has rows corresponding to the number of UEs 104 and columns corresponding to the number of frequencies available for the DL channels 105. Likewise, the matrix $X^u$ is a matrix having rows corresponding to the number of UEs 104 and columns corresponding to the number of frequencies available for the UL channels 103. The number of frequencies available for both the DL channels 105 and the UL channels 103 may be represented as a set of indices in accordance with any suitable type of convention, which may be based upon the number of frequencies used in accordance with a particular communication protocol. For instance, the frequency indices may reference a list of available frequencies numbered in order, with 0 or 1 representing the lowest available frequency or frequency band, and with each incremented index number representing the next highest frequency or frequency band in the list up to a maximum index value that corresponds to the highest available frequency or frequency band in the list.

The entries in each matrix $X^d$ and $X^u$ may be represented as a binary value of 0 or 1, for instance, which may function to map the specific frequencies from the list of available frequencies to specific DL channels 105 and UL channels 103 used by respective UEs 104. As an illustrative example, if the matrix $X^d$ has a value of 1 for entry (2, 3), this would mean that the third frequency available from the list is assigned to the second UE 104 associated with that position corresponding to the adjacency matrix B for the UL channel 103.

A. DL Channel Frequency Allocation

In an aspect, the process 600 begins via the base station 102 receiving (block 602) each identified set of UE frequency sharing groups, as discussed above and with reference to block 504, for instance, as well as any UEs 104 that are not part of a UE frequency sharing group. Using this information, the base station 102 then allocates (block 604) the DL channel frequencies. The DL channel frequency allocation may begin, for instance, with no frequency sharing assumption, i.e., $X \in \{0\}^{N \times N \times F}$ as in (12). In this case, the base station 102 may independently estimate the DL sum-SE as follows:

$$S^d(P^d, X^d) = \sum_{i \in I} \sum_{f \in F} \{\log(1 + \zeta^d_{(i,f)})\} \quad (38)$$

Then, using (38), the base station 102 may independently maximize the DL sum-SE for all UEs 104 as:

$$\underset{X^d}{\text{maximize}}\, S^d(P^d, X^d), \text{ subject to: } (6f) \text{ and } (6g) \quad (39)$$

Since legacy allocation for $P^d$ is considered, $X^d$ is the only variable in (39) to be optimized. For $UE_i \in Z_{all}$, a $f \in F$ that experiences the highest DL channel SINR (or alternatively, SNR) as per (12) is allocated as follows:

$$f^* = \underset{f}{\text{argmax}}(\zeta^d_{(i,f)}) \text{ and } X^d_{(i,f^*)} = 1; \quad (40)$$

$$\forall i \in Z_{all}, \forall f \in F$$

A new frequency resources set $F^n$ is initialized from F as $F^n \leftarrow F$ to track the frequencies available for UL allocation to un-grouped UEs. The DL channel frequencies allocated to un-grouped UEs are excluded from $F^n$ as:

$$F^n \leftarrow F^n \setminus \{Fz_{un_i}\}; \forall i \in Z_{un} \quad (41)$$

In other words, aspects include the base station 102 determining, for each UE 104 serviced by the base station 102, which DL channel frequency results in each respective UE 104 experiencing the highest SNR or SINR, as indicated above in (40). Thus, the frequency allocation process at block 604 may include the base station 102 repeating the process of identifying the best DL channel frequency for each UE based upon the SNR and/or SINR metric, and then initially allocating a downlink channel frequency to each serviced UE 104 based upon these measurements, irrespective of whether the UE 104 is part of a UE frequency sharing group or part of the set of qualifying UEs eligible for frequency sharing or non-eligible (e.g. eliminated) UEs for frequency sharing.

B. Shared Frequency Allocation

Once the DL channel frequencies are allocated to each of the UEs 104 serviced by the base station 102, aspects include the base station 102 allocating (block 606) the frequencies that are to be shared among the UE frequency sharing groups as both UL and DL channel frequencies. To do so, aspects include the base station 102 generating a set of qualifying DL channel frequencies by eliminating downlink channel frequencies that have already been allocated (block 604) to UEs 104 that were not identified as being a part of any set of UE frequency sharing groups (i.e. the un-grouped UEs). For example, and with reference to FIG. 1, this may include eliminating the frequency $f_5$ assuming that this frequency was allocated for use by the UE 104.4 for the DL channel 105.5, as the UE 104.4 is not part of any UE frequency sharing group such as the UEs 104.1, 104.2, 104.3 (Triplets) and the UEs 104.5, 104.6 (Twins). Thus, only DL channel frequencies allocated (block 604) to UE frequency sharing groups (e.g. UE Triplets and Twins such as those shown in FIG. 1) form part of the qualifying DL channel frequencies. The qualifying DL channel frequencies may then be further allocated, as discussed in further detail below, to be used as UL channel frequencies shared within the UE frequency sharing groups, as shown in Table 1500, which is illustrated in FIG. 15 and further discussed below. For example, Table 1500 indicates, as 'Option 1,' UL channel frequencies represented by $x^u(i,f)$ and $F''$, which are updated for all K Triplets (denoted as tr) and L Twins (denoted as tw) as follows:

$$\left.\begin{array}{l} f^* = \underset{f}{\operatorname{argmax}} x^d_{(z^k_{i{r_1}},f)} \text{ and } x^u_{(z^k_{i{r_2}},f^*)} = 1 \\ f^* = \underset{f}{\operatorname{argmax}} x^d_{(z^k_{i{r_2}},f)} \text{ and } x^u_{(z^k_{i{r_3}},f^*)} = 1 \\ f^* = \underset{f}{\operatorname{argmax}} x^d_{(z^k_{i{r_3}},f)} \text{ and } x^u_{(z^k_{i{r_1}},f^*)} = 1 \\ F^n \leftarrow F^n \setminus \{f^k_{i{r_3}} \cup f^k_{i{r_2}} \cup z^k_{i{r_3}}\} \end{array}\right\} (1 \le k \le K) \quad (42)$$

$$\left.\begin{array}{l} f^* = \underset{f}{\operatorname{argmax}} x^d_{(z^k_{i{w_1}},f)} \text{ and } x^u_{(z^k_{i{w_2}},f^*)} = 1 \\ f^* = \underset{f}{\operatorname{argmax}} x^d_{(z^k_{i{w_2}},f)} \text{ and } x^u_{(z^k_{i{w_1}},f^*)} = 1 \\ F^n \leftarrow F^n \setminus \{f^k_{i{w_1}} \cup f^k_{i{w_2}}\} \end{array}\right\} (1 \le l \le L) \quad (43)$$

In other words, the base station 102 uses the set of qualifying DL channel frequencies to select the DL channel frequencies for UEs 104 that are part of UE frequency sharing groups to again maximize the SNR and/or SINR values for those UEs 104 using the allocated DL channel frequencies, as discussed above for the DL channel frequency allocation (block 604). Aspects include the base station 102 further allocating (block 606) the UL channel frequencies in different combinations with the assignment of the DL channel frequencies within the various UE frequency sharing groups until an optimal combination of shared UL channel and DL channel frequencies are identified for each UE frequency sharing group. In an aspect, within a frequency sharing group, a UE specific SNR and/or SINR measurements on different frequencies may additionally or alternatively be used to allocate the frequency for UL channels. Thus, the entries $x^d$ and $x^u$ in (42) and (43) above each describe entries of the matrices $X^d$ and $X^u$ as described above.

C. UL Channel Frequency Allocation

At this stage in the frequency allocation process, the base station 102 has allocated (block 604) frequencies for the DL channels for UEs 104 not included as part of any frequency sharing groups, as well as allocating both the DL (block 604) and UL channel frequencies (block 606) for the UEs 104 that are part of UE frequency sharing groups. In this last stage of the frequency allocation process, the base station 102 now allocates (block 608) the UL channel frequency from those still available to the UEs 104 not included as part of any frequency sharing groups (i.e. the un-grouped UEs).

To do so, in an aspect the base station may estimate, following (38), the UL sum-SE using (7) as follows:

$$S^u(P^u, X^u) = \sum_{i \in I} \sum_{f \in F} \{\log(1 + \zeta^u_{(i,f)})\} \quad (44)$$

Because the UL frequency allocation for UE frequency sharing groups (e.g. Triplets and Twins) has already been performed as described above, the UL sum-SE maximization problem for un-grouped UEs is formulated using (44) as follows:

$$\underset{X^u}{\operatorname{maximize}} \, S^u(P^u, X^u), \text{ subject to: } (6e), (6g) \text{ and } (10b) \quad (45)$$

Again, legacy allocation is assumed for $P^u$ in (45), $X^u$ to be optimized for $Z_{un}$ UEs (i.e. for UEs 104 not included as part of any frequency sharing groups). For $UE_i \in Z_{un}$, a frequency $f \in F''$ that experiences the highest UL SINR (or optionally, the highest SNR) per (7) is thus allocated as:

$$f^* = \underset{f}{\operatorname{argmax}} (\zeta^u_{(i,f)}) \text{ and } x^u_{(i,f^*)} = 1, \forall i \in Z_{un}, \forall f \in F'' \quad (47)$$

Thus, at the end of this stage, the base station 102 has now determined each element within the matrices $X^d$ and $X^u$, which are used to allocate the DL channel frequencies and UL channel frequencies for each UE serviced by the base station 102 at a particular time, as discussed above. Using the UEs 104 in FIG. 1 as an example, aspects include the base station 102 allocating a shared frequency (e.g. $f_1$) as both the frequency of an UL channel 103 (e.g. UE 104.1) and as the frequency of a DL channel 105 (e.g. UE 104.2) for one or more (or all) UE frequency sharing groups (e.g. UEs 104.1, 104.2, 104.3 and UEs 104.5 and 104.6) by selecting this shared frequency ($f_1$) from among the set of qualifying DL channel frequencies as discussed above.

That is, aspects further include, once this frequency allocation is determined, the UEs 104 serviced by the base station 102 switching to or otherwise operating in accordance with these allocated frequencies. The allocation of the frequencies identified by the base station 102 described herein may be implemented, for instance, via communications from the base station 102 (e.g. via the DL channels 105) that may be performed in accordance with any suitable configuration instructions (e.g. control information) based upon the particular communication protocol that is implemented by the base station 102 to service the UEs 104, as discussed above (e.g. block 506). Again, this may include, for example, the transmission (by the base station 102) of configuration instructions to one or more (or all) of the services UEs 104 to cause the UE's 104 to use the allocated frequencies, which may include the allocation of DL channel frequencies, the UL channel frequencies, as well as shared UL and DL channel frequencies as discussed herein per each UE 104 serviced by the base station 102. For instance, and with reference to FIG. 1, this may cause the UE 104.1 to use the frequency (f1) for an uplink channel (103.1), the UE 104.2 to use the shared frequency (f1) for the downlink channel (105.1), as well as the other frequency allocations for each UE 104 and corresponding UL and DL channel frequency, as shown in FIG. 1.

Table 1500 summarizes an example of various portions for frequency allocation among a set of UEs 104 serviced via the base station 102, implementing the frequency allocation process as discussed herein and with reference to FIG. 6.

As shown in Table 1500, the frequency allocation for UE frequency sharing groups is compared to legacy UEs, which are not capable of using frequency sharing. Table 1500 demonstrates that frequency sharing allows twice as many UEs to operate with the same number of frequencies used by legacy devices.

Determination of Whether to Retain or Modify Current Resource Allocation

Figure 7:
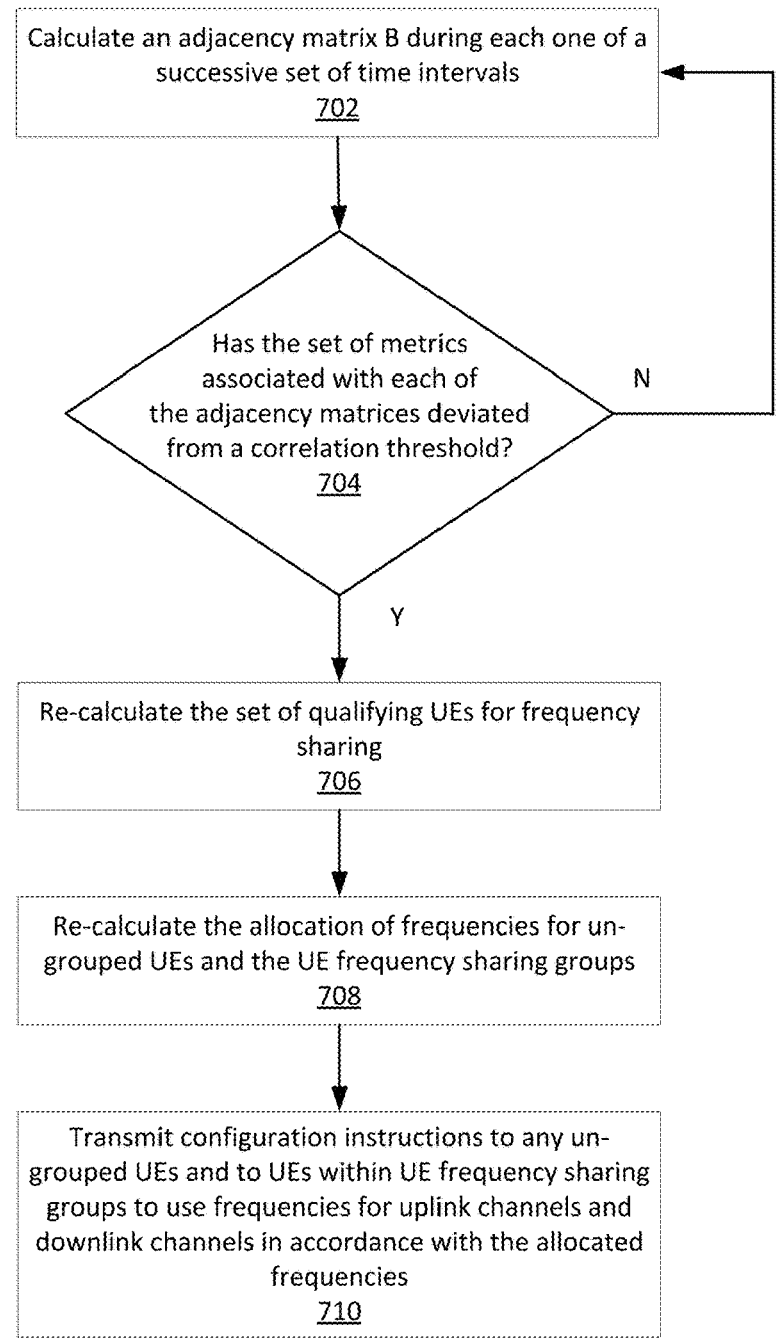
FIG. 7 illustrates an example flow for determining whether to retain or modify current resource allocation, in accordance with one or more aspects of the present disclosure.

FIG. 7 illustrates an example flow for determining whether to retain or modify current resource allocation, in accordance with one or more aspects of the present disclosure. As discussed above, the base station 102 may calculate an adjacency matrix B, which identifies the set of qualifying UEs 104 for frequency sharing based upon the various criteria discussed above (e.g. the threshold distance value, the SNR or SINR threshold requirement, and/or the ACK/NACK threshold requirement). Also, and as noted above, the set of qualifying UEs 104 may be determined based upon any suitable application of these criteria, in various aspects. For instance, the adjacency matrix B may represent the set of qualifying UEs 104 based upon UEs 104 that meet each of these three criteria.

Again, the geographic location of UEs 104 plays an important role in UE grouping, as this was one of the criteria discussed above for determine the set of qualifying UEs 104 for frequency sharing, from which the grouped UEs are selected. Thus, if the location of the UEs 104 that are serviced by the base station 102 remain the same, their grouping will also generally stay intact. And, even for moving UEs 104, the UE groups identified for a current time period (e.g. a TTI) can still remain valid for subsequent time periods (e.g. subsequent TTIs) based on their mobility profiles. Moreover, if radio channel conditions are maintained and are good (e.g. the SNR or SINR threshold requirement and the NACK requirement are each met), then the frequency allocation to the UEs 104 may also be unchanged.

As discussed above, the adjacency matrix B in (18) at a point in time contains a set of metrics regarding the set of qualifying UEs 104 for frequency sharing, the UE frequency sharing groups, and the base station 102 may maintain information with respect to the distance between each UE within each UE frequency sharing group as well as the frequencies allocated to each of the UEs 104 for the UL and DL channels 103, 105. Aspects include the base station 102 monitoring or otherwise measuring changes in the set of metrics associated with the adjacency matrix B to determine whether to re-trigger UE groupings and/or frequency allocations.

To do so, aspects include the base station 102 calculating (block 702) the adjacency matrix B at various time periods, which may be once per TTI or any other suitable schedule such that successive sets of metrics associated with calculated adjacency matrices B are calculated. The base station 102 may then compare changes and/or correlations (block 704) between successively calculated sets of metrics associated with the adjacency matrix B over time to determine whether the UEs 104 included in each UE frequency sharing group and/or the allocation of shared frequencies should be changed. IF this comparison indicates that the adjacency matrices have not changed over time beyond a predetermine threshold value, as further discussed below, then the base station 102 may continue to calculate the adjacency matrix B and repeat the process of monitoring the adjacency matrix B for additional changes.

To make this determination, aspects include the base station 102 using a measurement of a correlation of successive sets of metrics associated with different adjacency matrices B that were calculated over successive time periods. This correlation may be made in any suitable manner and using any suitable number and type of correlation techniques. By way of example and not limitation, aspects include the base station 102 using a Pearson correlation coefficient ($\rho$), which is a measure of linear dependence on elements of the adjacency matrix B across several time periods (e.g. TTIs) for this purpose. Because only grouped UEs 104 are of interest, aspects include the base station 102 calculating (block 702) during each time period a modified adjacency matrix $B_m$, which is derived from B in (18) and its elements as follows:

$$b_{m(i,j)} = b_{m(j,i)} = \begin{cases} b_{(i,j)}, & \text{if } i, j \in Z_{tr}^k (1 \leq k \leq K) \text{ or } Z_{tw}^l (1 \leq l \leq L) \\ 0, & \text{otherwise} \end{cases} \quad (48)$$

This non-limiting example assumes that the base station 102 calculates a new adjacency matrix B in accordance with the aspects discussed above every TTI, but this again may include any suitable time period or schedule. With reference to (48) above, $B_{mt}$ represents in this example the modified adjacency matrix $B_m$ at time instant t, while $B_{m(t+\tau)}$ is determined after t seconds, incremented in steps of 1 ms TTI for LTE-A. UE frequency sharing groups and frequency allocation performed at $\tau=0$ remain valid until $\rho$, estimated between $B_{mt}$ and $B_{m(t+\tau)}$, and stay above a pre-defined threshold confidence level, which may be selected based upon the particular application, recognizing trade-offs in performance and the time and processing to update the UE frequency sharing groups and the allocation of frequencies to the UEs 104 serviced by the base station 102. Once $\rho$ is reduced below this confidence level, however, a UE grouping is then re-triggered, which causes the base station 102 to re-calculate (block 706) the set of qualifying UEs for frequency sharing (e.g. as discussed herein with respect to FIG. 5) as well as re-calculating an updated frequency allocation (e.g. (e.g. as discussed herein with respect to FIG. 6). In this way, the use of the correlation of changes in the adjacency matrices B over time greatly reduces the computational load at the base station 102 on every TTI (or other time period that is used) after $\tau=0$, until $\rho$ stays above the pre-defined confidence level. Moreover, this computational gain is also significant for other communication protocols that have TTIs shorter than 1 ms, as the UE groupings and frequency allocations performed at $\tau=0$ can remain valid for more TTIs.

Compared to legacy resource allocation techniques available in literature for HICN, the aspects described herein have significant advantages to enhance sum-SE, and function within the bounds of practical timing constraints. A comparative summary is given in Table 2 below.

TABLE 2

| Legacy Algorithms | Proposed Algorithm |
|---|---|
| Either assume all CSIs are available or require additional computational and signaling is overhead for SL CSI. Frequency sharing among random choice of UEs based on the SINR they experience. Need to perform new resource allocation at every TTI. | Makes use of UL and DL CSIs available in existing cellular systems and a location-aware technique proposed for SL CSI. Frequency sharing within identified UE groups based on multi-level constraints imposed for UE grouping. A measure on the adjacency matrix helps to retain the current TTI allocation for subsequent TTIs. |

Additional Details Regarding Hardware Implementation

Figure 8:
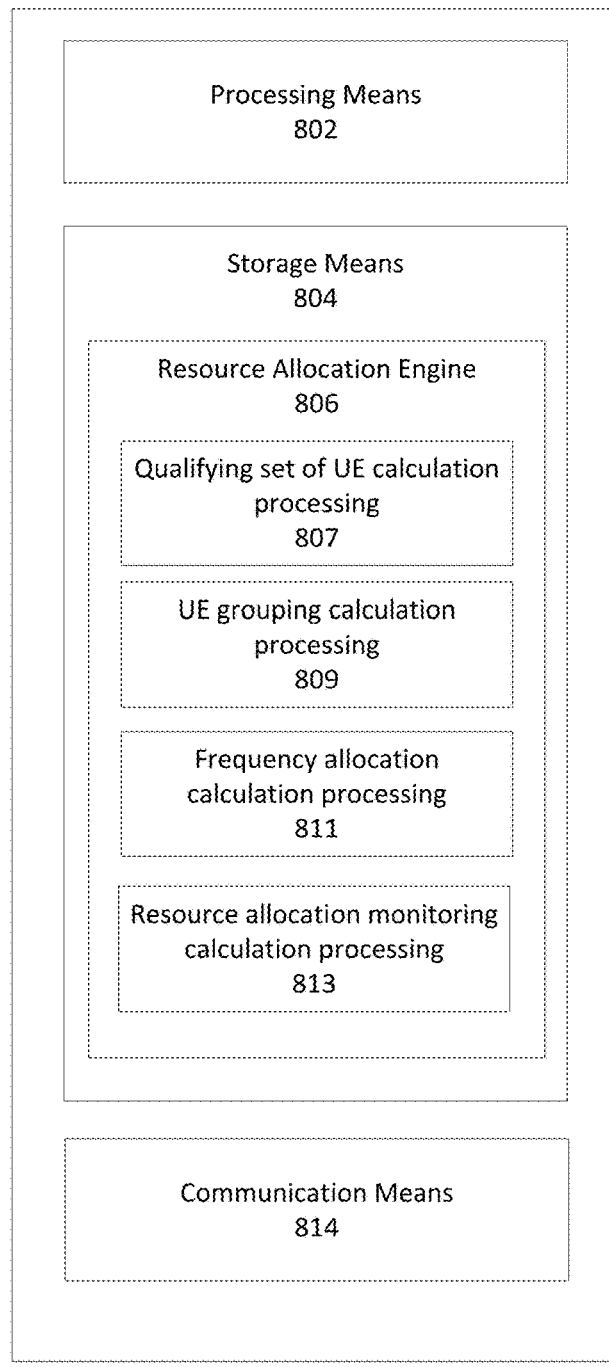
FIG. 8 illustrates an example device, in accordance with one or more aspects of the present disclosure.

FIG. 8 illustrates an exemplary computing means, in accordance with various aspects of the present disclosure. The computing means 800 may be a device and/or be identified with one or more components of the base station 102 as discussed herein with respect to FIG. 1, which performs the various processing operations to perform resource allocation as discussed herein. Again, the aspects described herein are not limited to the examples described herein, and the functions performed by the computing means 800 may additionally or alternatively be performed by other components of a system (e.g., another base station or component in communication with the base station 102, which is not shown in FIG. 1 for purposes of brevity, one of the UEs 104, etc.).

In an aspect, the computing means 800 may be implemented in different ways depending upon the particular application, type, and use with respect to the base station in which it is installed or otherwise forms a part. For instance, the computing means 800 may be identified with one or more portions of a base station that services several UEs as discussed herein. Alternatively, the computing means 800 may be implemented as a computing platform such as a server computer, a cloud computing platform, a mobile device, etc., that may be in communication with the base station 102. The computing means 800 may thus represent components and functions associated with the base station 102 and/or other components, and which may form part of different components or the same component, depending upon the particular application.

Regardless of the particular implementation, to perform the various functionality as described herein, the computing means 800 may include a processing means 802, a storage means 804, and a communication means 814. The components shown in FIG. 8 are provided for ease of explanation, and aspects include the computing means 800 implementing additional, less, or alternative components as those shown in FIG. 8. For instance, the computing means 800 may form part of (or the entirety of) the various components used by the base station 102 for operations such as encoding of decoding of communication signals between UEs, supporting various type of communications with other devices via backhaul links, etc.

In various aspects, the processing means 802 may be configured as any suitable number and/or type of computer processors, which may function to control the computing means 800, the base station or other component in which it is implemented, or other components of the particular system or component(s) in which it is implemented. Processing means 802 may be identified with one or more processors (or suitable portions thereof) implemented by the computing means 800 and/or base station 102. For example, the processing means 802 may be identified with one or more processors such as a host processor, a digital signal processor, one or more microprocessors, graphics processors, microcontrollers, an application-specific integrated circuit (ASIC), part (or the entirety of) a field-programmable gate array (FPGA), etc. As another example, the processing means 802 may form part of (or the entirety of) the processors, hardware components, and/or software components implemented by the base station 102 to facilitate or otherwise support operation of the base station 102 in accordance with the aspects described herein, as well as in accordance with the known functions performed by base stations more generally.

In any event, aspects include the processing means 802 being configured to carry out instructions to perform arithmetical, logical, and/or input/output (I/O) operations, and/or to control the operation of one or more components of computing means 800 and/or base station 102 to perform various functions associated with the aspects as described herein from the perspective of the base station 102, for instance. For example, the processing means 802 may include one or more microprocessor cores, memory registers, buffers, clocks, etc., and may generate electronic control signals associated with electronic components to control and/or modify the operation of one or more components of the computing means 800, the base station 102, and/or components of the system in which it is implemented as discussed herein. Moreover, aspects include processing means 802 communicating with and/or controlling functions associated with the storage means 804 and/or the communication means 814.

In an aspect, the storage means 804 stores data and/or instructions such that, when the instructions are executed by the processing means 802, the computing means 800 and/or the base station 102 performs the various functions as described herein. The storage means 804 may be implemented as any suitable type (including known types) of volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The storage means 804 can be non-removable, removable, or a combination of both. For example, the storage means 804 may be implemented as a non-transitory computer readable medium storing one or more executable instructions such as, for example, logic, algorithms, code, etc., the functionality of executing such instructions via the processing means 802 being further discussed below.

As further discussed below, the instructions, logic, code, etc., stored in the storage means 804 are represented by the various modules as shown in FIG. 8, which may enable the aspects disclosed herein to be functionally realized. Alternatively, if the aspects described herein are implemented via hardware, the modules shown in FIG. 8 associated with the storage means 804 may include instructions and/or code to facilitate the control and/or monitoring of the operation of such hardware components. In other words, the modules shown in FIG. 8 are provided for ease of explanation regarding the functional association between hardware and software components. Thus, aspects include the processing means 802 executing the instructions stored in these respective modules in conjunction with one or more hardware components to perform the various functions associated with the aspects as further discussed herein.

In an aspect, the various modules shown in FIG. 8 may form part of a resource allocation engine 806, which may function as an algorithm executing by the processing means 802, for instance, as discussed herein to realize the assignment of specific UL and DL channel frequencies to UEs serviced by the base station 102. Thus, the resource allocation engine 806 may represent the functionality discussed herein with respect to the base station 102 as shown in FIG. 1, for example. To do so, aspects include the resource allocation engine 806 including a qualifying set of UE calculation processing module or block 807, a UE grouping calculation processing module or block 809, a frequency allocation calculation processing module or block 811, and a resource allocation monitoring calculation module or block 813.

In an aspect, the executable instructions stored in qualifying set of UE calculation processing module or block 807 may facilitate, in conjunction with the execution via the processing means 802, the determination of the set of qualifying UEs for frequency sharing, and may include the calculation of the adjacency matrix B as discussed herein. This determination of the set of qualifying UEs for frequency sharing may include, for instance, analyzing geographic location data received via one or more UEs 104 serviced by the base station 102 and/or other metrics such as the reported SNR, SINR, ACK, and/or NACK reports. Thus, the executable instructions stored in qualifying set of UE calculation processing module or block 807 may facilitate, in conjunction with the execution via the processing means 802, the determination of the set of qualifying UEs using one or more of the criteria discussed above such as the threshold distance requirement, the SNR or SINR threshold requirement, and the NACK requirement (e.g. represented in (15), (17) and (18), respectively) as discussed with reference to FIGS. 2A-2C.

In an aspect, the executable instructions stored in the UE grouping calculation processing module or block 809 may facilitate, in conjunction with execution via the processing means 802, the determination of UE frequency sharing groups, as well as any un-grouped UEs. The groups of UEs may be determined in this manner, for instance, using the calculated adjacency matrix and determining a selection of Twin and Triplet UE groupings, as well as any un-grouped UEs, as discussed above with reference to FIG. 5 for example.

In an aspect, the executable instructions stored in the frequency allocation calculation processing module or block 811 may facilitate, in conjunction with execution via the processing means 802, the calculation of the allocation of frequencies to each UE 104 serviced by the base station 102 in accordance with the identified UE grouping. The allocation of frequencies to each UE 104, which may be shared among UE frequency sharing groups as discussed herein, may be determined in this manner, for instance, using the three stage process of allocating DL channel frequencies, allocating shared frequencies among DL and UL channels, and allocating UL channel frequencies as discussed above with reference to FIG. 6.

In an aspect, the executable instructions stored in the resource allocation monitoring calculation module or block 813 may facilitate, in conjunction with execution via the processing means 802, the monitoring of the set of metrics associated with successive sets of adjacency matrices to identify whether a re-calculation of the UE frequency sharing groups and the re-calculation of the frequency allocation to UEs serviced by the base station 102 needs to be performed. The determination of whether these re-calculations need to be performed in this manner may be, for instance, in accordance with the use of the adjacency matrix correlation analysis and comparison to a correlation threshold as discussed above with reference to FIG. 7.

To transmit data to and receive data from the UEs 104 serviced by the base station 102, aspects include the computing means 800 implementing a communication means 814. The communication means 814 may enable communications in accordance with any suitable communication protocol(s) between the base station 102 and the serviced UEs 104, for instance, as discussed with reference to FIG. 1. To do so, the communication means 814 may be implemented as any suitable number and/or type of components configured to facilitate communications in this manner, which may include for example one or more antennas, transmitters, receivers, transceivers, ports, and any suitable combination of hardware and/or software components to facilitate the processing of signals to be transmitted and signals received such as modulators, mixers, demodulators, demappers, upconverters, downconverters, front ends, analog-to-digital converters, digital-to-analog converters, etc.

The communication means 814 may thus function to, for example, receive signals from the UEs 104 transmitted via the UL channels 103 and transmit signals to the UEs 104 via the DL channels 105, in each case using the allocated frequencies at a current time as discussed herein. The communication means 814 may additionally transmit configuration instructions (e.g. control information) to one or more UEs 104 serviced by the base station 102 to cause those UEs to communicate with the base station 102 in accordance with the allocated frequencies for the DL and UL channels as discussed herein, for instance, with reference to FIG. 5, as well as updated allocation of frequencies as discussed herein with reference to FIG. 7, for instance.

Appendix A

Mathematical Problem Formulation

In this Appendix, details are provided for the mathematically formulation of the resource allocation problem for the HICN 100 with a goal to maximize sum-SE. The variables used and their definitions are provided in Table 3 below. Unless otherwise specified, the UEs and HICN referenced throughout this section may be applicable to the UEs 104 and the HICN 100 as shown in FIG. 1, for instance. Moreover, references to UL and DL may be identified, for instance, with the uplink and downlink channels 103, 105, respectively.

TABLE 3

| Variable | Definition |
|---|---|
| $p_{i,max}^{u}$ | Maximum limit on UL transmit power to $UE_i$ |
| $p_{i,max}^{d}$ | Maximum limit on DL transmit power to $UE_i$ |
| $p_{max}^{BS}$ | Total DL transmit power at BS for all N UEs |
| $g_{(i,b,f)}^{u}$ | UL channel gain from $UE_i$ to BS on $f \in F$ |
| $g_{(b,i,f)}^{d}$ | DL channel gain from BS to $UE_i$ on $f \in F$ |
| $p_{(i,f)}^{u}$ | UL transmist power allocated by BS for $UE_i$ on $f \in F$ |
| $p_{(i,f)}^{d}$ | DL transmist power allocated by BS for $UE_i$ on $f \in F$ |
| $p_{(j,i,f)}^{s}$ | SL recieved power at $UE_i$ from $UE_j$ on $f \in F$ |
| $g_{(j,i,f)}^{s}$ | SL recieved power at $UE_j$ from $UE_i$ on $f \in F$ |
| M, Q | Number of grouped and un-grouped UEs respectively |

Let a set I={1, 2, 3, . . . , N} contains the UE indices of all N UEs in a HICN and the available frequency resources form a set F={1, 2, 3, . . . , Ḟ}. UL Signal-to-Interference-plus-Noise Ratio (SINR) of $UE_i$ on f measured at BS can be estimated as, $$\zeta_{(i,j)}^{u} = \frac{x_{(i,j)}^{u} p_{(i,j)}^{u} g_{(i,b,f)}^{u}}{\sigma_n^2 + \sum_{j=1(j \neq i)}^{N} x_{(j,f)}^{d} p_{(j,f)}^{d} \gamma}; \forall i \in I, \forall f \in F \quad (2)$$

In (2), γ is the SIC coefficient to account for the residual SI power post SIC at an IBFD BS receiver. When the BS transmits pd (j,f) power in DL to UEj on f, it results in the residual SI power of pd(j,f)γ on f at its receiver. Frequency allocation details to UEs are captured in matrices $X^u \in \{0,1\}^{N \times \hat{F}}$ and $X^d \in \{0,1\}^{N \times \hat{F}}$ in (3) for UL and DL, respectively, and their elements are determined as, $$x^u_{(i,f)} = \begin{cases} 1, & \text{if } f \text{ allocated to } UE_i \text{ for } UL \\ 0, & \text{otherwise} \end{cases} \quad (3)$$

$$x^d_{(i,f)} = \begin{cases} 1, & \text{if } f \text{ allocated to } UE_i \text{ for } DL \\ 0, & \text{otherwise} \end{cases}$$

Similarly, DL SINR of UEi on f measured at UEi can be estimated as, $$\zeta^d_{(i,f)} = \frac{x^d_{(i,f)} p^d_{(i,f)} g^d_{(i,b,f)}}{\sigma^2_n + \sum^N_{j=1(j \neq i)} x^u_{(j,f)} p^u_{(j,f)} g^u_{(j,i,f)}}; \forall i \in I, \forall f \in F \quad (4)$$

Since $g^s_{(j,i,f)}$ in (4) accounts for SL channel gain from $UE_j$ to $UE_i$ on f, SL in-band interference power at $UE_i$ from $UE_j$ is given by $p^u_{(j,f)} g^s_{(j,i,f)}$, if $UE_j$ and $UE_i$ share same f for UL and DL respectively. Then the sum-SE achieved by all N UEs in UL and DL can be estimated as, $$S(P^u, P^d, X^u, X^d) = \sum_{i \in I} \{\log(1 + \zeta^u_{(i,f)}) + \log(1 + \zeta^d_{(i,f)})\}; \forall f \in F \quad (5)$$

In an aspect, using (5), a resource allocation algorithm may be implemented for a HICN in (6) as follows:

$$\underset{P^u, P^d, X^u, X^d}{\text{maximize}} S(P^u, P^d, X^u, X^d), \text{subject to:} \quad (6a)$$

$$\sum_{f \in F} p^u_{(i,f)} \leq P^u_{i,max}; \forall i \in I \quad (6b)$$

$$\sum_{f \in F} p^d_{(i,f)} \leq P^d_{i,max}; \forall i \in I \quad (6c)$$

$$\sum_{i \in I} \sum_{f \in F} p^d_{(i,f)} \leq P^{BS}_{max} \quad (6d)$$

$$\sum_{i \in I} x^u_{(i,f)} \leq 1; \forall f \in F \quad (6e)$$

$$\sum_{i \in I} x^d_{(i,f)} \leq 1; \forall f \in F \quad (6f)$$

$$(x^u_{(i,f)} + x^d_{(i,f)}) \leq 1; \forall i \in I, \forall f \in F \quad (6g)$$

Main optimization variables in (6) are $P^u$, $P^d$, $X^u$ and $X^d$ subject to the constraints from (6b) to (6g). Here, (6b) and (6c) restrict the maximum permissible transmit power for a UE in UL and DL, respectively. Similarly, maximum DL transmit power limit for all UEs in BS is given in (6d). Since at the maximum one frequency resource for UL and another one for DL are allocated per UE, (6e) and (6f) guarantee respectively these restrictions for UL and DL. Finally, (6g) ensures that the same frequency resource cannot be allocated to a HD UE for both UL and DL.

Although the resource allocation problem formulated in (6) can be optimally solved via exhaustive search, its computational complexity increases exponentially as the number of UEs, frequency resources increase and becomes NP-hard, making it infeasible for practical systems. For example, a transmission time interval (TTI) of 1 ms is the scheduling granularity in LTE-A, meaning the power and frequency allocation can effectively change every millisecond. Moreover, this 1 ms TTI in 4G is reduced to 62.5 us in 5G, and can go down further in case of mini-slot scheduling. These shorter TTIs tighten the complexity requirement of resource allocation algorithms furthermore to get deployed.

Therefore, due to NP-hard nature of the optimal resource allocation algorithm for HICN, the aspects herein implement a resource allocation algorithm that uses approximations introduced to the original problem defined in (6). Though there will be some level of residual SI in an IBFD BS post SIC, γ in (2) is assumed to be zero. This assumption helps to concentrate on the resource allocation part for HICN rather than SIC related aspects. Moreover, it makes UL and DL allocation independent of each other, except for UE-to-UE or SL in-band interference which is handled differently below. With this fair assumption, UL SINR in (2) is modified as follows:

$$\zeta^u_{(i,f)} = \frac{x^u_{(i,f)} p^u_{(i,f)} g^u_{(i,b,f)}}{\sigma^2_n}; \forall i \in I, \forall f \in F \quad (7)$$

Since the sum-SE is improved by sharing frequencies among UEs, DL SINR in (4) is modified as, $$\zeta^d_{(i,f)} = \frac{x^d_{(i,f)} p^d_{(i,f)} g^d_{(b,i,f)}}{\sigma^2_n + \sum^N_{j=1} x_{(i,j,f)} p^u_{(j,f)} g^s_{(j,i,f)}}; \forall i \in I, \forall f \in F \quad (8)$$

and the details of frequency sharing are captured in a matrix $X \in \{0,1\}^{N \times N \times \hat{F}}$ in (8) as, $$x_{(i,j,f)} = \begin{cases} 1, & \text{if } f \text{ is shared between } UE_i \text{ and } UE_j; \forall i, j (i \neq j) \\ 0, & \text{otherwise} \end{cases} \quad (9)$$

The sum-SE in (5) is now estimated using modified UL and DL SINR from (7) and (8) respectively. Then, the sum-SE maximization problem in (6) is re-formulated as:

$$\underset{P^u, P^d, X^u, X, X^d}{\text{maximize}} S(P^u, P^d, X^u, X, X^d), \text{subject to: } (6b)\text{-}(6g), \quad (10a)$$

$$\sum_{i \in I} \sum_{j \in I} x(i, j, f) \leq 1; \forall f \in F \quad (10b)$$

Another optimization variable X is introduced in (10) to bring in frequency sharing aspects, as (10b) guarantees that a frequency resource f can be at the maximum shared with a pair of UEs.

A. Estimation of Different CSIs at BS

UL CSI ($g^u_{(i,b,f)}$), DL CSI ($g^d_{(b,i,f)}$) and SL CSI ($g^s_{(j,i,f)}$) are the various CSIs required in the sum-SE maximization problem formulated in (10) for a HICN. Since it is the BS which allocates power and frequencies to all UEs, with the knowledge of these allocation details and feedback reports from UEs, the BS can estimate UL and DL CSIs. However, the challenge is to estimate the SL CSI for which a location-aware approach is introduced below.

Estimation of SL CSI

The received power at UE can be estimated using the standard relation below.

$$P_R = P_T + G_R + G_T - PL + X_{\sigma_s} \quad (11)$$

where,

PT, GT→Transmit power and antenna gain of BS;
PR, GR→Receive power and antenna gain of UE;
PL→DL path loss. COST HATA path loss model in (12) is used to estimate this PL;
$X\sigma s$→Shadowing effect. In case of no fading, this variable is 0, while in fading scenarios, it is a Gaussian distributed random variable with zero mean and $\sigma_s$ standard deviation in dB;

$$PL = 46.3 + 33.9 \log(f) - 13.82 \log(h_{BS}) - a(h_{UE}, f) + (44.9 - 6.55 \log(h_{BS})) \log(d) + C \quad (12)$$

where, $a(hUE, f)$→UE height correlation factor given in (13);
f→Carrier frequency from DL bandwidth in MHz;
d→Distance between BS and UE in Kilo Meters (KM);
$h_{BS}$→Height of BS in meters given in Table 4 (Appendix D);
$h_{UE}$→Height of UE in meters given in Table 4;
C→3 dB for Urban and Suburban Areas and 0 dB for Metropolitan Area;

$$a(h_{UE}, f) = (1.1 \log_{10}(f) - 0.7) h_{UE} - (1.56 \log_{10}(f) - 0.8) \quad (13)$$

To estimate UE-to-UE SL, power at $UE_i$ from $UE_j$, (11) is used with below changes:

PT, GT→Transmit power and antenna gain of UEj;
PR, GR→Receive power and antenna gain of UEi;
PL→SL Path loss from UEj to UEi;
COST HATA model in (12) is used for SL PL in (11) with below changes:
f→Carrier frequency from UL bandwidth in MHz since UEj is transmitting;
d→Distance (dji) between UEj to UEi in KM from (1);
hUE is substituted for hUE and hBS since UEj is transmitting and UEi is receiving in SL;

Using the above adaptations in (12) and transmit power of UEj, SL in-band received power at UEi can be estimated from (11). With the knowledge of transmit power of UEj and SL in-band received power at UEi, SL CSI can be estimated.

B. Power Allocation

The Legacy power algorithm remains unchanged, meaning $P^u$, $P^d$ in (10) need not to be freshly estimated. Thus, only the new frequency allocation algorithm for HICN in accordance with the aspects described herein is considered to enhance sum-SE.

Appendix B

In this Appendix, Details are Provided for UE Groupings Using Triplets and Twins.

Following Lemma 1 and 2, the aspects described herein use examples of grouping the set of qualifying UEs into groups of Triplets and Twins by way of example and not limitation. An optimal combination of K ($0 \leq K \leq \text{floor}(N/3)$) Triplets and/or L ($0 \leq L \leq \text{floor}(N/2)$) Twins are identified from B in (18) for the base station 102 to maximize the number of grouped UEs (i.e., $3K+2L \rightarrow N$). The kth Triplet set with three arbitrary UEs is given as follows:

$$Z_{tr}^k = \{p, q, r \in I\}; (1 \leq k \leq K) \quad (24)$$

and two Triplet sets are said to be disjoint if and only if:

$$Z_{tr}^j \cap Z_{tr}^k = \{\emptyset\}; (1 \leq j, k \leq K, j \neq k) \quad (25)$$

A complete Triplets set $Z_{tr}$ that contains all disjoint Triplet sets is given as:

$$Z_{tr} = \bigcup_{k=1}^{K} Z_{tr}^k \quad (26)$$

Similarly, for Twins, the $l^{th}$ Twin set with two arbitrary UEs is given as:

$$Z_{tw}^l = \{p, q \in I\}; (1 \leq l \leq L) \quad (27)$$

and two Twin sets are disjoint provided:

$$Z_{gr}^j \cap Z_{tr}^l = \{\emptyset\}; (1 \leq j, l \leq L, j \neq l) \quad (28)$$

A complete Twins set $Z_{tw}$ that contains all disjoint Twin sets is given as:

$$Z_{tw} = \bigcup_{l=1}^{L} Z_{tw}^l \quad (29)$$

All Triplets from (26) and Twins from (29) form a grouped UEs set $Z_{gr}$ as:

$$Z_{gr} = \{Z_{tr} \cup Z_{tw}\}; (0 \leq |Z_{gr}| \leq 3K+2L) \quad (30)$$

and all un-grouped UEs form an un-grouped UEs set $Z_{un}$ as:

$$Z_{un} = \{j \in I | j \notin Z_{gr}\}; (0 \leq |Z_{un}| \leq N - |Z_{gr}|) \quad (31)$$

In (26), (29), (30) and (31), if no Triplet or Twin or grouped UEs or un-grouped UE(s) is/are identified, the respective set will be a null ($\{\phi\}$) set. Finally, a cumulative set $Z_{all}$ consists of all grouped and un-grouped UEs sets from (30) and (31), in a specific order, is given as:

$$Z_{all} = \{Z_{tr} \cup Z_{tw} \cup Z_{un}\} = \{Z_{gr} \cup Z_{un}\} \text{ such that}$$
$$|Z_{all}| = |Z_{tr}| + |Z_{tw}| + |Z_{un}| = |Z_{gr}| + |Z_{un}| = N \quad (32)$$

Appendix C

In this Appendix, Details are Provided for a Time Complexity Analysis.

Determining the Adjacency Matrix

The N×N adjacency matrix B determined in three steps in (15), (17) and (18) involves mainly the comparison operation. Since it is a symmetric matrix with only N (N−1)/2 unique upper-triangular elements, determining B can be performed in O(3N(N−1)/2). Additionally, the modified adjacency matrix $B_m$, determined only from M (≤N) UEs, can be performed in O(N).

Correlation Coefficient Estimation

Since the correlation coefficient ($\rho$) is estimated from $B_m$, it can also be performed in O(N).

UE Grouping

Triplets Identification

All cycles in an undirected graph G (V, E) can be identified with the worst-case time complexity of O(|V|+|E|)=O (N+|E|) using DFS. Since Triplet is a smallest cycle, identification of all Triplets present in B can be performed in ≤O (N+|E|).

Twins Identification

The number of operations required for Greedy graph coloring algorithm, which may be used in accordance with the aspects described herein to identify all Twins present in B, is $O(N+2|E|)$.

Optimal (Triplets:Twins) Search Algorithm

As discussed above, the time complexity analysis may also done in three steps as follows:

Step 1: As given in (34), there can be $\chi$ number of independent-Triplets sets present in B.

Step 2: For $i^{th}$ independent-Triplets set, again for every k Triplets searches from $K_i$ to 0, an equal number of Twins identification should be attempted. Since the maximum number of independent-Triplets in B is floor (N/3), the number of Twins identification attempts shall be $$\sum_{k=0}^{floor(\frac{N}{3})} \left( \begin{array}{c} floor(\frac{N}{3}) \\ floor(\frac{N}{3}) - k \end{array} \right)$$

This factor is multiplied by $\chi$ in (34) to account for all independent-Triplets sets.

Step 3: Since the best combination search among all $\chi$ independent-Triplets sets involve finding maximum only, from (34), this time complexity would be $O(N)$.

So, the overall time complexity of a UE Grouping is $\leq O(N+|E|)+O(N)*O(N+2|E|)+O(N)$. With Y number of Triplets identified in $\leq O(N+|E|)$ time complexity, this optimal search hovers around multiple Twins identification attempts performed in $O(N^2)$.

Frequency Allocation

Finding the maximum and assigning are the only operations involved in frequency allocation. DL channel frequency allocation for all UEs in (40), the shared frequency allocation for Triplets and Twins, respectively, in (42) and (43), and the UL channel frequency allocation for un-grouped UEs in (46) may be performed in O(2N) for UL and DL channels.

Cumulative Time Complexity

Cumulative time complexity of the aspects described herein in a TTI, for instance, is the sum of individual time complexities discussed above, and it is computationally trackable for practical values of N for both LTE-A and NR, as examples. Moreover, until the estimated p described above remains above a pre-fixed confidence level, the UE grouping, and resource allocation computations can be avoided. This is a significant reduction on the computational load of the base station 102 during those TTIs.

Appendix D

In this Appendix, Details are Provided for a Simulation Methodology.

In this section, a simulation methodology is described to evaluate the performance of the resource allocation algorithm for LTE-A, which may be extended to NR or any other suitable communication protocols. In this example, the MATLAB LTE Toolbox was implemented to develop the simulation test bench and configuration parameters used for the simulation, derived from 3GPP and ITU-R, which are listed in Table 4 below. Specifically, Table 4 includes LTE-A simulation parameters that, in this example, are provided in accordance with a small cell (PICO) Frequency Division Duplex base station.

TABLE 4

| Parameters | Values |
|---|---|
| Number of UEs (N) | 8 |
| UL/DL Carrier Frequency | 1.88 GHz/1.96 GHz |
| E-UTRA Band/System Bandwidth/ Total Number of PRBs[a] | 2/10 MHz/50 |
| Control Format Indicator (CFI)/RBG | 3 OFDM Symbols/ 3 PRBs |
| Number of RBGs allocated per UE (W) | 2 |
| Modulation & Coding Rate | QPSK & 1/3 |
| BS Coverage Range (R) | 66 m |
| BS/UE Maximum Transmit Power | 24 dBm/23 dBm |
| BS/UE Antenna Height | 10 m/1.5 m |
| BS/UE Antenna Gain | 5 dBi/0 dBi |
| BS[b]/UE[c] REFSENS | −93.5 dBm/−95 dBm |
| Target UL/DL/Total sum-Throughput for N UEs in 10 ms | 40320 Bits/39776 Bits/ 80096 Bits |
| Parameters for Legacy HD Allocation | Values |
| Number of UL PRBs used for UL | 48 (16 RBGs) |
| Number of DL PRBs used for DL | 48 (16 RBGs) |
| Number of unused PRBs[a] | 2 |
| Bandwidth allocated (excluding guard band)[a,d] | 8.64 MHz |
| Total bandwidth allocated from UL and DL Bands | 17.28 MHz |
| Target sum-SE averaged over 10 ms | 0.46 Bits/s/Hz |
| Parameters for Proposed Algorithm[e] | Values |
| Number of UL PRBs used for UL and DL | 24 (8 RBGs) |
| Number of DL PRBs used for UL and DL | 24 (8 RBGs) |
| Number of unused PRBs[a] | 26 |
| Bandwidth allocated (excluding guard band)[a,f] | 4.23 MHz |
| Total bandwidth allocated from UL and DL | 8.64 MHz |
| Target sum-SE averaged over 10 ms | 0.93 Bit/s/Hz |

[a]Applicable for UL and DL Bandwidths
[b]BS - 10 MHz BW, QPSK and 1/3 Code Rate [12]
[c]UE - 10 MHz BW, QPSK and 1/3 Code Rate [8]
[d]48 PRBs * 12 Subcarriers * 15 KHz SCS
[e]Applicable when M = N
[f]24 PRBs * 12 Subcarriers * 15 KHz SCS A. Mapping to LTE-A Parameters In LTE-A, the Physical Resource Block (PRB) is a smallest resource element allocated by its scheduler, and the number of PRBs vary according to the system bandwidth. A set of PRBs form a Resource Block Group (RBG), which is the minimum allocation granularity. Let W RBGs define a frequency resource f and all frequency resources from both UL and DL bandwidth form a complete set F with $|F|=\tilde{F}$. It is further assumed that the channel response is flat within W RBGs, and power of Additive White Gaussian Noise (AWGN) is the same in every W RBGs, denoted by $\sigma^2_n$. Additionally, SL in-band interference is also treated as AWGN.

B. Spatial Distribution Models for UEs

Since UE-to-UE in-band interference seriously impacts the frequency sharing possibilities among UEs in a HICN, spatial distribution of UEs plays a crucial role in performance analysis. Stochastic geometry theory provides such spatial models to analyze wireless network performance. For random number of UEs, their geographical locations are modeled by Poisson Point Process (PPP). Another commonly used point process is Binomial Point Process (BPP), which is same as PPP except that the number of UEs is fixed. In this example, for a generic system level simulation PPP is used, whereas for simulation with specific number of UEs, BPP is used to model their geographical locations within the coverage range (R) of a Pico BS.

C. Modeling UE Mobility and Radio Channel Randomness

Out of N UEs, it is assumed N/2 UEs to be static while the remaining N/2 UEs are moving with velocity varying up to $V_{max}$. Due to this mobility, the Euclidean distance matrix A determined in (1) shall vary every TTI. Moreover, the cumulative effect of randomness based on SNR constraints and ACK/NACK reports discussed above are captured in a single probabilistic parameter a for every UE. This a value defines the probability of a UE to refrain from UE grouping. If the displacement of UEs is significant in a TTI and/or based on a, the adjacency matrix B determined in (18) might change every TTI.

Results and Discussions

Figure 10:
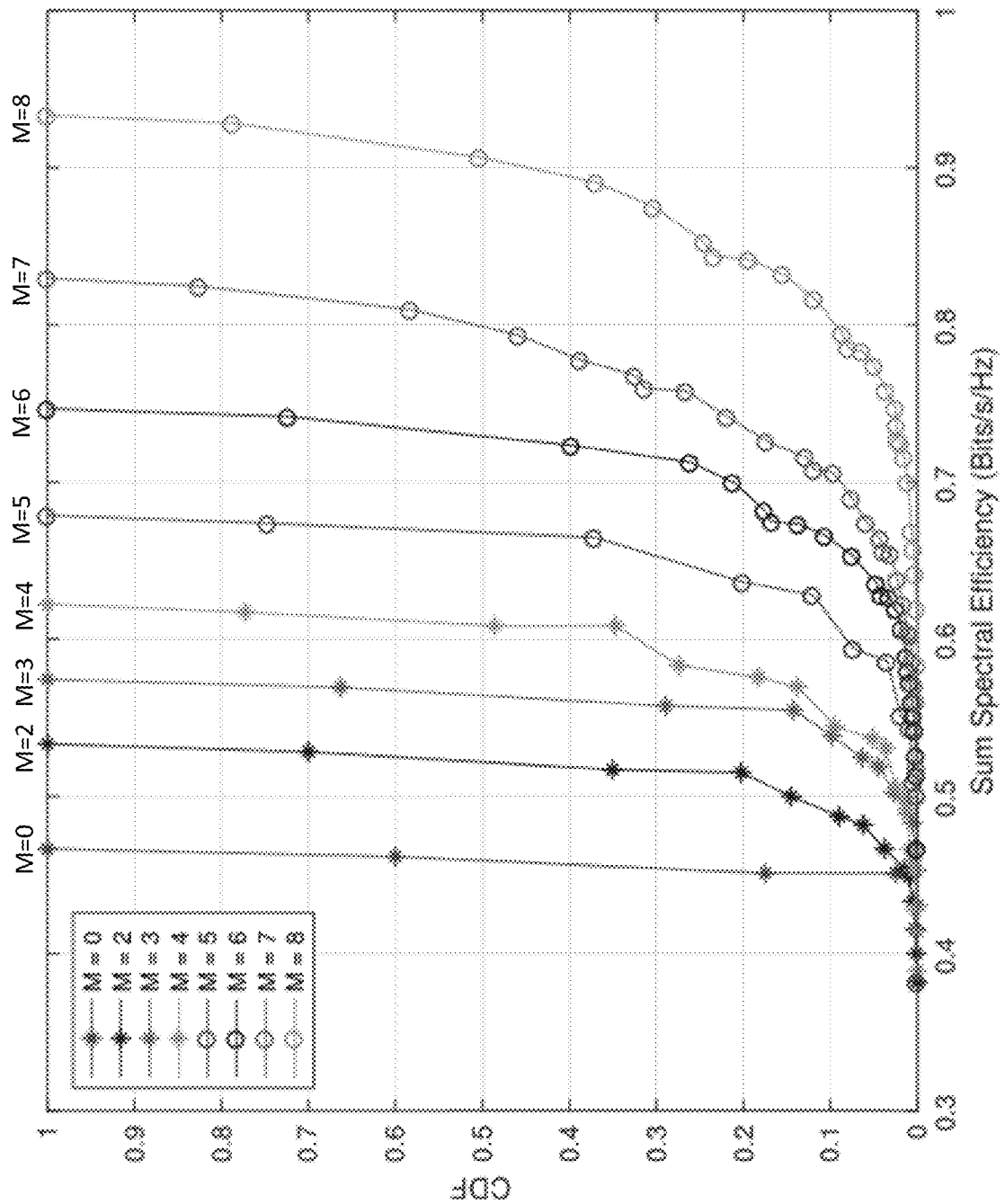
FIG. 10 illustrates an example CDF of sum-SE achieved for different M configured at SNR=4 dB, N=8 and σs=4 dB, in accordance with one or more aspects of the present disclosure.

Sum-SE and sum-throughput are the two standard metrics used in this simulation to unleash the performance of the aspects of the resource allocation algorithm. Computation details of $d_{min}$ threshold are given in above for different values of Shadowing effect standard deviation ($\sigma_s$) in (A.1). Since $\sigma_s$ is around 3 to 4 dB for small cell BS, the $d_{min}$ threshold corresponding to $\sigma s=4$ from FIG. 14 is used in this simulation. The CDFs of sum-SEs estimated over 1000 LTE frames for different $d_{min}$ thresholds are plotted in FIG. 9 for comparative analysis. Primarily, maximum sum-SE achieved is doubled over legacy HD systems, since all N UEs are grouped in most cases, i.e., M=N. However, without considering the shadowing effect, i.e., for $d_{min}=d_{min_{initial}}$, the median of sum-SE CDF is relatively less due to perceivable UE-to-UE SL in-band interference caused by frequency sharing among closely spaced UEs. With the correct $d_{min}$ threshold, i.e., $$d_{min} = d_{min_{initial}} + d_{min_{offset_2}},$$

the median of sum-SE CDF is at its best achieving 89% of theoretically expected target sum-SE mentioned in Table 4 over the legacy HD system. For higher values of $d_{min}$, i.e., $$d_{min} = d_{min_{initial}} + x * d_{min_{offset_2}} (2 \leq x \leq 5),$$

the median of sum-SE CDF is again less as shown in FIG. 9 due to lower M. If M is restricted from 0 (legacy HD) to N (complete IBFD) for the entire test duration due to various factors discussed herein, the maximum sum-SE achievable shall also be limited accordingly as shown in FIG. 10.

Figure 11:
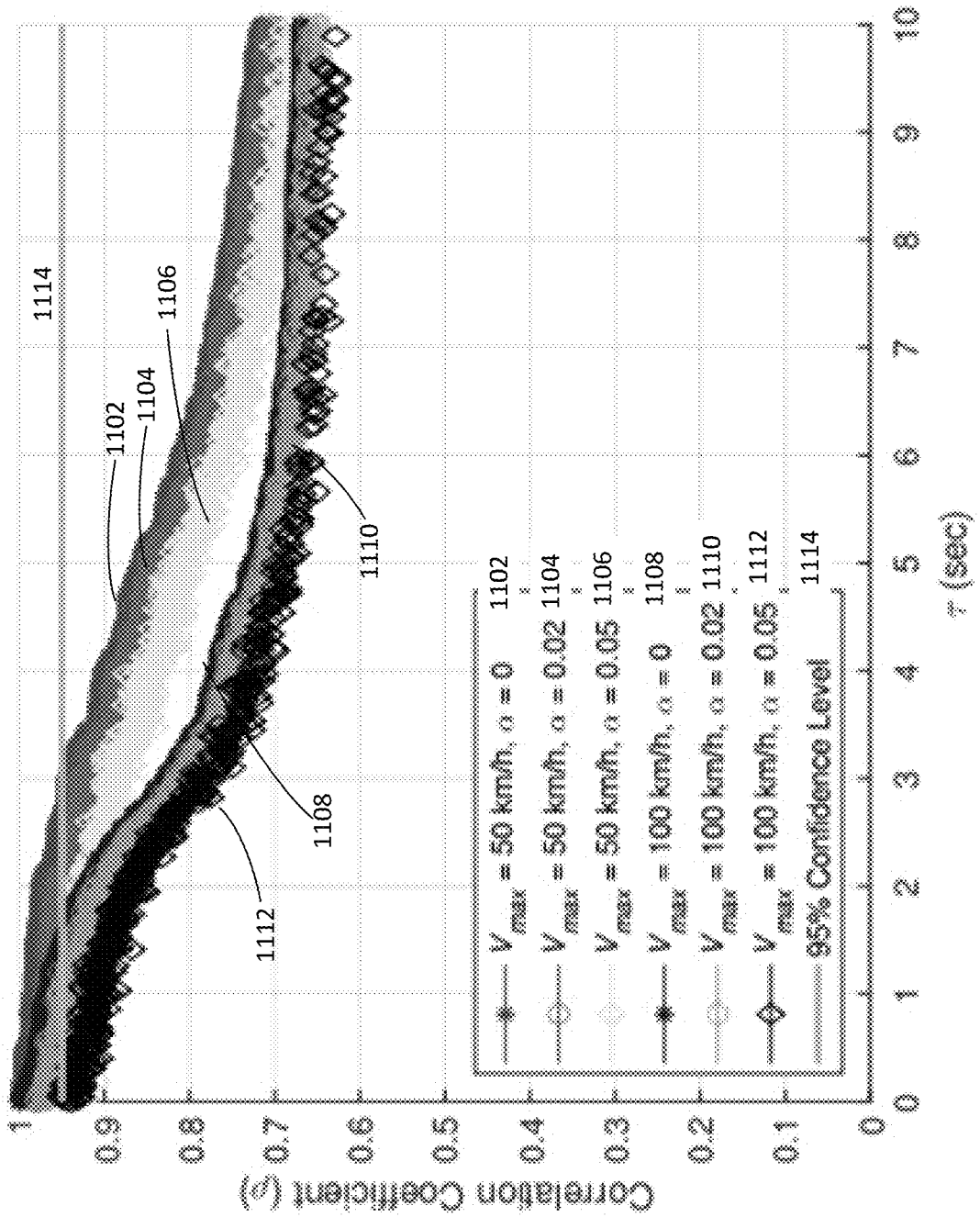
FIG. 11 illustrates a correlation coefficient (ρ) of $B_m$ across TTIs for different $V_{max}$ and α, in accordance with one or more aspects of the present disclosure.
Figure 12:
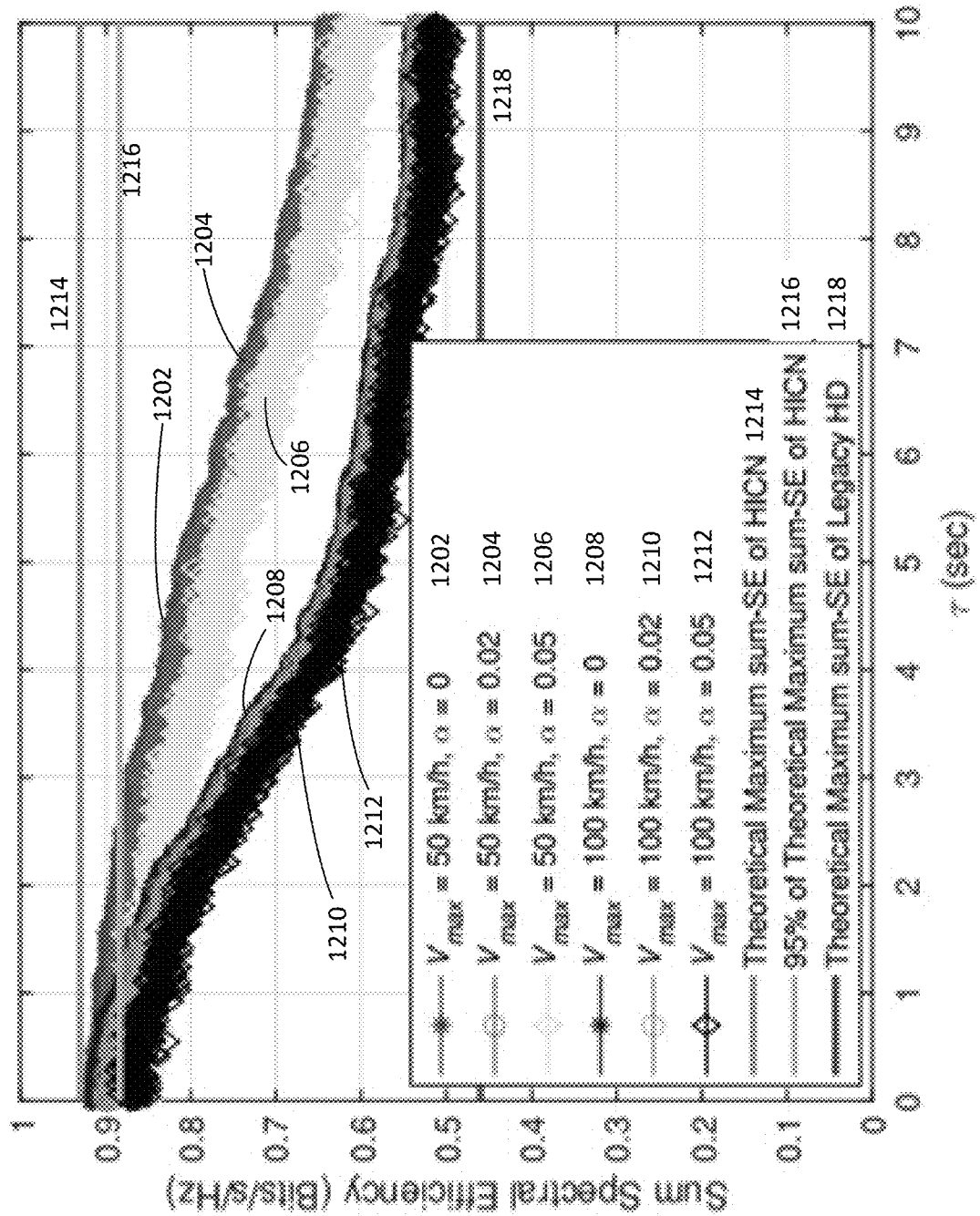
FIG. 12 illustrates the sum-SE achieved across TTIs for a fixed UE Grouping and resource allocation for different $V_{max}$ and α, in accordance with one or more aspects of the present disclosure.

The Pearson correlation coefficient ($\rho$) computed between $B_{mt}$ and $B_{m(t+\tau)}$ for varying r is plotted in FIG. 11 for different values of $V_{max}$ and $\alpha$. From these results, it can be observed that in spite of the UEs' mobility and randomness in wireless channels, $\rho$ stays above a 95% confidence level for a significant number of TTIs depending upon $V_{max}$ and $\alpha$. Retaining the UE grouping and resource allocation performed at $\tau=0$ for the rest of the TTIs, sum-SE achieved is plotted in FIG. 12 for same set of $V_{max}$ and $\alpha$. It is evident that the sum-SE also remains above 95% of its maximum theoretical limit and closely follows p in TTIs of interest.

Figure 13:
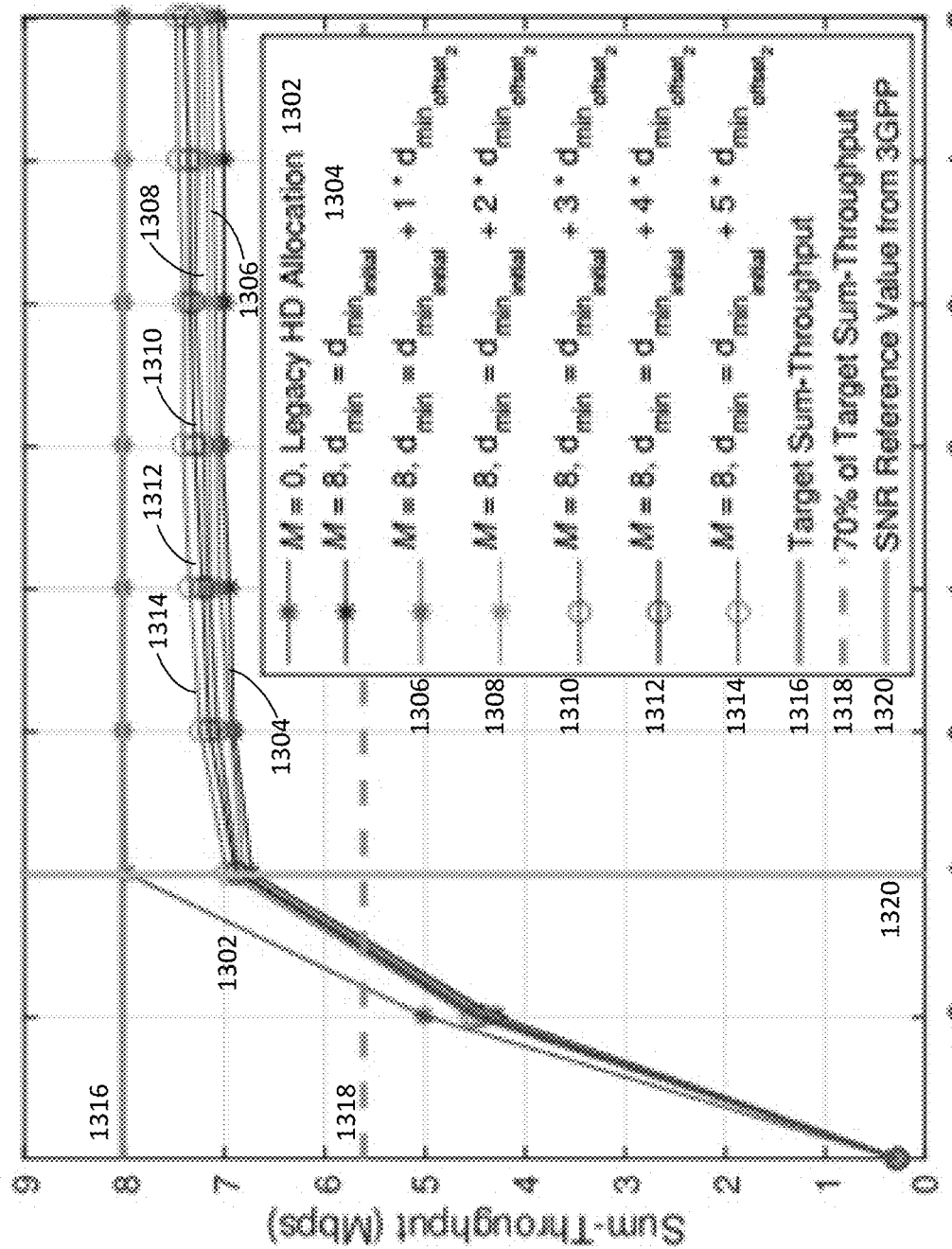
FIG. 13 illustrates the sum-Throughput achieved for different $d_{min}$ thresholds for M=N=8 and $\sigma_s$=4 dB, in accordance with one or more aspects of the present disclosure.

Another metric is the sum-throughput plotted in FIG. 13 for different $d_{min}$ thresholds, again with same multiplications factors of $$d_{min_{offset_2}}.$$

Unlike sum-SE, sum-throughput increases with increase in $d_{min}$ threshold due to improved decoding performance. It can be observed from FIG. 13 that 88% of target sum-throughput mentioned in Table 4 is achieved at $$d_{min} = d_{min_{initial}} + d_{min_{offset_2}}$$

for the entire operating range of SNR when the sum-SE gain is 89%. This achievement is quite remarkable for HICN. As per the performance requirements from 3GPP, for example, a UE must achieve 70% of target throughput at SNR=−1 dB for 10 MHz bandwidth using QPSK. As shown in FIG. 13, sum-throughput achieved indeed meets these targets for legacy HD and the frequency allocation algorithm discussed herein, thus certifying the simulation test bench.

Examples

The following examples pertain to further aspects.

Example 1 is a base station, comprising: a communication means for (i) transmitting signals to a plurality of user equipments (UEs) using a plurality of downlink channels, and (ii) receiving signals from the plurality of UEs using a plurality of uplink channels, to enable the base station to service the plurality of UEs; and a processing means for: determining, from among the plurality of UEs, a set of qualifying UEs for utilizing channel frequency sharing between one another to communicate with the base station, the set of qualifying UEs being determined based upon a distance between each UE from among the plurality of UEs; and determining, from among the set of qualifying UEs, a UE frequency sharing group, the UE frequency sharing group including at least a first UE and a second UE, wherein the communication means transmits configuration instructions to the first UE and to the second UE to cause (i) the first UE to (i) use a shared frequency for an uplink channel from among the plurality of uplink channels, and (ii) the second UE to use the shared frequency for a downlink channel from among the plurality of downlink channels.

In Example 2, the subject matter of Example 1, wherein the base station services the plurality of UEs in accordance with a hybrid In Band Full Duplex (IBFD) cellular network.

In Example 3, the subject matter of any combination of Examples 1-2, wherein the processing means determines the UE frequency sharing group as a group of two UEs or a group of three UEs.

In Example 4, the subject matter of any combination of Examples 1-3, wherein the processing means determines the set of qualifying UEs further based upon UEs from among the plurality of UEs (i) operating in excess of a threshold signal-to-noise ratio (SNR) and/or (ii) reporting a number of negative acknowledgement (NACK) reports in excess of a threshold NACK report number.

In Example 5, the subject matter of any combination of Examples 1-4, wherein the processing means determines the set of qualifying UEs based upon UEs from among the plurality of UEs having a distance between one another that exceeds a threshold distance value.

In Example 6, the subject matter of any combination of Examples 1-5, wherein the processing means determines the threshold distance value using a distance offset factor to account for randomness of interference caused by other UEs from among the plurality of UEs.

In Example 7, the subject matter of any combination of Examples 1-6, wherein the UE frequency sharing group is from among a set of UE frequency sharing groups, and wherein the processing means determines an allocation of the shared frequency by: allocating, from among a plurality of downlink channel frequencies, a downlink channel frequency to each UE from among the plurality of UEs based upon respective signal-to-interference-plus-noise ratio (SINR) measurements; generating a set of qualifying downlink channel frequencies by eliminating downlink channel frequencies allocated to UEs that are not part of the set of UE frequency sharing groups; and allocating the shared frequency to the first UE and the second UE in the UE frequency sharing group by selecting the shared frequency from among the set of qualifying downlink channel frequencies.

In Example 8, the subject matter of any combination of Examples 1-7, wherein the processing means calculates, for each one of a successive set of time periods, a set of metrics indicative of a distance between each UE within the UE frequency sharing group, and determines whether the UEs included in the UE frequency sharing group and/or the shared frequency should be changed based upon a correlation of the set of metrics over the successive set of time periods.

In Example 9, the subject matter of any combination of Examples 1-8, and further including a machine-readable storage including machine-readable instructions that, when executed, realize functionality of the base station as claimed in any preceding Example.

Example 10 is a computer-implemented method, comprising: transmitting, via a base station, signals to a plurality of user equipments (UEs) using a plurality of downlink channels; receiving, via the base station, signals from the plurality of UEs using a plurality of uplink channels, wherein transmitting the signals and receiving the signals enable the base station to service the plurality of UEs; and determining, via the base station, from among the plurality of UEs, a set of qualifying UEs for utilizing channel frequency sharing between one another to communicate with the base station, the set of qualifying UEs being determined based upon a distance between each UE from among the plurality of UEs; determining, via the base station from among the set of qualifying UEs, a UE frequency sharing group, the UE frequency sharing group including at least a first UE and a second UE; and transmitting, via the base station, configuration instructions to the first UE and to the second UE to cause (i) the first UE to (i) use a shared frequency for an uplink channel from among the plurality of uplink channels, and (ii) the second UE to use the shared frequency for a downlink channel from among the plurality of downlink channels.

In Example 11, the subject matter of Example 10, wherein the act of determining the UE frequency sharing group comprises determining the UE frequency sharing group as a group of two UEs or a group of three UEs.

In Example 12, the subject matter of any combination of Examples 10-11, wherein the act of determining the set of qualifying UEs comprises determining the set of qualifying UEs further based upon UEs from among the plurality of UEs that are (i) operating in excess of a threshold signal-to-noise ratio (SNR) and/or (ii) reporting a number of negative acknowledgement (NACK) reports in excess of a threshold NACK report number.

In Example 13, the subject matter of any combination of Examples 10-12, wherein the act of determining the set of qualifying UEs comprises determining the set of qualifying UEs further based upon UEs from among the plurality of UEs having a distance between one another that exceeds a threshold distance value.

In Example 14, the subject matter of any combination of Examples 10-13, wherein the UE frequency sharing group is from among a set of UE frequency sharing groups, and wherein the act of determining an allocation of the shared frequency comprises: allocating, from among a plurality of downlink channel frequencies, a downlink channel frequency to each UE from among the plurality of UEs based upon respective signal-to-interference-plus-noise ratio (SINR) measurements; generating a set of qualifying downlink channel frequencies by eliminating downlink channel frequencies allocated to UEs that are not part of the set of UE frequency sharing groups; and allocating the shared frequency to the first UE and the second UE in the UE frequency sharing group by selecting the shared frequency from among the set of qualifying downlink channel frequencies.

In Example 15, the subject matter of any combination of Examples 10-14, further comprising: calculating, via the base station, for each one of a successive set of time periods, a set of metrics indicative of a distance between each UE within the UE frequency sharing group; and determining, via the base station, whether the UEs included in the UE frequency sharing group and/or the shared frequency should be changed based upon a correlation of the set of metrics over the successive set of time periods.

Example 16 is a base station, comprising: a transceiver configured to (i) transmit signals to a plurality of user equipments (UEs) using a plurality of downlink channels, and (ii) receive signals from the plurality of UEs using a plurality of uplink channels, to enable the base station to service the plurality of UEs; and a one or more processors configured to: determine, from among the plurality of UEs, a set of qualifying UEs for utilizing channel frequency sharing between one another to communicate with the base station, the set of qualifying UEs being determined based upon a distance between each UE from among the plurality of UEs; and determine, from among the set of qualifying UEs, a UE frequency sharing group, the UE frequency sharing group including at least a first UE and a second UE, wherein the transceiver is configured to transmit configuration instructions to the first UE and to the second UE to cause (i) the first UE to (i) use a shared frequency for an uplink channel from among the plurality of uplink channels, and (ii) the second UE to use the shared frequency for a downlink channel from among the plurality of downlink channels.

In Example 17, the subject matter of Example 16, wherein the base station services the plurality of UEs in accordance with a hybrid In Band Full Duplex (IBFD) cellular network.

In Example 18, the subject matter of any combination of Examples 16-17, wherein the one or more processors are configured to determine the UE frequency sharing group as a group of two UEs or a group of three UEs.

In Example 19, the subject matter of any combination of Examples 16-18, wherein the one or more processors are configured to determine the set of qualifying UEs further based upon UEs from among the plurality of UEs (i) operating in excess of a threshold signal-to-noise ratio (SNR) and/or (ii) reporting a number of negative acknowledgement (NACK) reports in excess of a threshold NACK report number.

In Example 20, the subject matter of any combination of Examples 16-19, the one or more processors are configured to determine the set of qualifying UEs based upon UEs from among the plurality of UEs having a distance between one another that exceeds a threshold distance value.

In Example 21, the subject matter of any combination of Examples 16-20, the one or more processors are configured to determine the threshold distance value using a distance offset factor to account for randomness of interference caused by other UEs from among the plurality of UEs.

In Example 22, the subject matter of any combination of Examples 16-21, wherein the UE frequency sharing group is from among a set of UE frequency sharing groups, and wherein the one or more processors are configured to determine an allocation of the shared frequency by: allocating, from among a plurality of downlink channel frequencies, a downlink channel frequency to each UE from among the plurality of UEs based upon respective signal-to-interference-plus-noise ratio (SINR) measurements; generating a set of qualifying downlink channel frequencies by eliminating downlink channel frequencies allocated to UEs that are not part of the set of UE frequency sharing groups; and allocating the shared frequency to the first UE and the second UE in the UE frequency sharing group by selecting the shared frequency from among the set of qualifying downlink channel frequencies.

In Example 23, the subject matter of any combination of Examples 16-22, wherein the one or more processors are configured to calculate, for each one of a successive set of time periods, a set of metrics indicative of a distance between each UE within the UE frequency sharing group, and determine whether the UEs included in the UE frequency sharing group and/or the shared frequency should be changed based upon a correlation of the set of metrics over the successive set of time periods.

In Example 24, the subject matter of any combination of Examples 16-23, further including a machine-readable storage including machine-readable instructions that, when executed, realize functionality of the base station as claimed in any preceding Example.

An apparatus as shown and described.

A method as shown and described

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A base station, comprising:
a transceiver configured to (i) transmit signals to a plurality of user equipments (UEs) using a plurality of downlink channels, and (ii) receive signals from the plurality of UEs using a plurality of uplink channels, to enable the base station to service the plurality of UEs; and
one or more processors configured to:
determine, from among the plurality of UEs, a set of qualifying UEs for utilizing channel frequency sharing between one another to communicate with the base station, the set of qualifying UEs being determined based upon a distance between each UE from among the plurality of UEs; and determine, from among the set of qualifying UEs, a set of UE frequency sharing groups, each UE frequency sharing group from among the set of UE frequency sharing groups comprising a group of two UEs or a group of three UEs, wherein the set of UE frequency sharing groups is determined based upon a plurality of frequency sharing efficiencies, each one of the plurality of frequency sharing efficiencies corresponding to a respective one of a plurality of different combinations of UE frequency sharing groups, the frequency sharing efficiency increasing proportionally with a number of UE frequency sharing groups, wherein a UE frequency sharing group from among the set of UE frequency sharing groups includes at least a first UE and a second UE, and wherein the transceiver is configured to transmit configuration instructions to the first UE and to the second UE to cause (i) the first UE to use a shared frequency for an uplink channel from among the plurality of uplink channels, and (ii) the second UE to use the shared frequency for a downlink channel from among the plurality of downlink channels.

2. The base station of claim 1, wherein the base station services the plurality of UEs in accordance with a hybrid In Band Full Duplex (IBFD) cellular network.

3. The base station of claim 1, wherein the one or more processors are configured to determine the set of qualifying UEs further based upon UEs from among the plurality of UEs (i) operating in excess of a threshold signal-to-noise ratio (SNR) and/or (ii) reporting a number of negative acknowledgement (NACK) reports in excess of a threshold NACK report number.

4. The base station of claim 1, wherein the one or more processors are configured to determine the set of qualifying UEs based upon UEs from among the plurality of UEs having a distance between one another that exceeds a threshold distance value.

5. The base station of claim 4, wherein the one or more processors are configured to determine the threshold distance value using a distance offset factor to account for randomness of interference caused by other UEs from among the plurality of UEs.

6. The base station of claim 1,
wherein the one or more processors are configured to determine an allocation of the shared frequency by:
allocating, from among a plurality of downlink channel frequencies, a downlink channel frequency to each UE from among the plurality of UEs based upon respective signal-to-interference-plus-noise ratio (SINR) measurements;
generating a set of qualifying downlink channel frequencies by eliminating downlink channel frequencies allocated to UEs that are not part of the set of UE frequency sharing groups; and
allocating the shared frequency to the first UE and the second UE in the UE frequency sharing group by selecting the shared frequency from among the set of qualifying downlink channel frequencies.

7. The base station of claim 1, wherein the one or more processors are configured to calculate, for each one of a successive set of time periods, a set of metrics indicative of a distance between each UE within the UE frequency sharing group, and determine whether the UEs included in the UE frequency sharing group and/or the shared frequency should be changed based upon a correlation of the set of metrics over the successive set of time periods.

8. A computer-implemented method, comprising:
transmitting, via a base station, signals to a plurality of user equipments (UEs) using a plurality of downlink channels;
receiving, via the base station, signals from the plurality of UEs using a plurality of uplink channels,
wherein transmitting the signals and receiving the signals enable the base station to service the plurality of UEs;
determining, via the base station from among the plurality of UEs, a set of qualifying UEs for utilizing channel frequency sharing between one another to communicate with the base station, the set of qualifying UEs being determined based upon a distance between each UE from among the plurality of UEs;
determining, via the base station from among the set of qualifying UEs, a set of UE frequency sharing groups, each UE frequency sharing group from among the set of UE frequency sharing groups comprising a group of two UEs or a group of three UEs,
wherein the set of UE frequency sharing groups is determined based upon a plurality of frequency sharing efficiencies, each one of the plurality of frequency sharing efficiencies corresponding to a respective one of a plurality of different combinations of UE frequency sharing groups, the frequency sharing efficiency increasing proportionally with a number of UE frequency sharing groups,
wherein a UE frequency sharing group from among the set of UE frequency sharing groups includes at least a first UE and a second UE, and
transmitting, via the base station, configuration instructions to the first UE and to the second UE to cause (i) the first UE to use a shared frequency for an uplink channel from among the plurality of uplink channels, and (ii) the second UE to use the shared frequency for a downlink channel from among the plurality of downlink channels.

9. The method of claim 8, wherein the determining the set of qualifying UEs comprises determining the set of qualifying UEs further based upon UEs from among the plurality of UEs that are (i) operating in excess of a threshold signal-to-noise ratio (SNR) and/or (ii) reporting a number of negative acknowledgement (NACK) reports in excess of a threshold NACK report number.

10. The method of claim 8, wherein the determining the set of qualifying UEs comprises determining the set of qualifying UEs further based upon UEs from among the plurality of UEs having a distance between one another that exceeds a threshold distance value.

11. The method of claim 8,
wherein the determining an allocation of the shared frequency comprises:
allocating, from among a plurality of downlink channel frequencies, a downlink channel frequency to each UE from among the plurality of UEs based upon respective signal-to-interference-plus-noise ratio (SINR) measurements;
generating a set of qualifying downlink channel frequencies by eliminating downlink channel frequencies allocated to UEs that are not part of the set of UE frequency sharing groups; and
allocating the shared frequency to the first UE and the second UE in the UE frequency sharing group by selecting the shared frequency from among the set of qualifying downlink channel frequencies.

12. The method of claim 8, further comprising:
calculating, via the base station for each one of a successive set of time periods, a set of metrics indicative of a distance between each UE within the UE frequency sharing group; and
determining, via the base station, whether the UEs included in the UE frequency sharing group and/or the shared frequency should be changed based upon a correlation of the set of metrics over the successive set of time periods.

13. A non-transitory computer-readable medium having machine-readable instructions stored thereon that, when executed by a processor of a base station, cause the base station to:
transmit signals to a plurality of user equipments (UEs) using a plurality of downlink channels, and receive signals from the plurality of UEs using a plurality of uplink channels, to enable the base station to service the plurality of UEs;
determine, from among the plurality of UEs, a set of qualifying UEs for utilizing channel frequency sharing between one another to communicate with the base station, the set of qualifying UEs being determined based upon a distance between each UE from among the plurality of UEs;
determine, from among the set of qualifying UEs, a set of UE frequency sharing groups, each UE frequency sharing group from among the set of UE frequency sharing groups comprising a group of two UEs or a group of three UEs,
wherein the set of UE frequency sharing groups is determined based upon a plurality of frequency sharing efficiencies, each one of the plurality of frequency sharing efficiencies corresponding to a respective one of a plurality of different combinations of UE frequency sharing groups, the frequency sharing efficiency increasing proportionally with a number of UE frequency sharing groups,
wherein a UE frequency sharing group from among the set of UE frequency sharing groups includes at least a first UE and a second UE, and
transmit configuration instructions to the first UE and to the second UE to cause (i) the first UE to use a shared frequency for an uplink channel from among the plurality of uplink channels, and (ii) the second UE to use the shared frequency for a downlink channel from among the plurality of downlink channels.

14. The base station of claim 1, wherein the one or more processors are configured to determine each UE frequency sharing group by maximizing the frequency sharing efficiency.

15. The base station of claim 1, wherein the one or more processors are configured to compute the frequency sharing efficiency $\eta(\%)$ by evaluating:

$$\eta(\%) = \frac{N}{M+2Q} \times 100,$$

wherein:
N represents a number of the plurality of UEs,
M represents a number of the set of UE frequency sharing groups, and
Q represents a number of ungrouped UEs from among the plurality of UEs.

16. The base station of claim 1, wherein when the base station and each one of the plurality of UEs are In Band Full Duplex (IBFD) cellular network capable, the frequency sharing efficiency has an upper bound of 100%.

17. The base station of claim 1, wherein the one or more processors are configured to determine the set of qualifying UEs based upon a set of constraints that are indicative of UEs from among the plurality of UEs that are (i) operating in excess of a threshold signal-to-noise ratio (SNR), (ii) reporting a number of negative acknowledgement (NACK) reports in excess of a threshold NACK report number, and (iii) have a distance between one another that exceeds a threshold distance value.

18. The base station of claim 17, wherein the one or more processors are configured to compute an adjacency matrix by applying the set of constraints to entries in the adjacency matrix to determine the set of qualifying UEs.

19. The base station of claim 1, wherein the frequency sharing efficiency comprises, for each respective one of the plurality of different combinations of UE frequency sharing groups, a ratio between a number of the plurality of UEs and a sum of (i) the number of UE frequency sharing groups, and (ii) a number that is proportional to a number of ungrouped UEs.

20. The base station of claim 1, wherein the set of UE frequency sharing groups is determined by selecting one of the plurality of different combinations of UE frequency sharing groups corresponding to the highest frequency sharing efficiency.

* * * * *